(12) United States Patent
Sugita

(10) Patent No.: US 9,759,897 B2
(45) Date of Patent: Sep. 12, 2017

(54) ERECTING EQUAL-MAGNIFICATION LENS ARRAY UNIT, IMAGE READING DEVICE AND IMAGE FORMING DEVICE

(71) Applicant: KYOCERA CORPORATION, Kyoto (JP)

(72) Inventor: Tomoya Sugita, Machida (JP)

(73) Assignee: KYOCERA Corporation, Kyoto (JP)

( * ) Notice: Subject to any disclaimer, the term of this patent is extended or adjusted under 35 U.S.C. 154(b) by 86 days.

(21) Appl. No.: 14/770,729

(22) PCT Filed: Feb. 26, 2014

(86) PCT No.: PCT/JP2014/001033
§ 371 (c)(1),
(2) Date: Aug. 26, 2015

(87) PCT Pub. No.: WO2014/132644
PCT Pub. Date: Sep. 4, 2014

(65) Prior Publication Data
US 2016/0004051 A1    Jan. 7, 2016

(30) Foreign Application Priority Data

Feb. 26, 2013 (JP) ................................. 2013-036142
Feb. 26, 2013 (JP) ................................. 2013-036143

(51) Int. Cl.
G02B 13/26 (2006.01)
G02B 13/22 (2006.01)
(Continued)

(52) U.S. Cl.
CPC ............. G02B 13/26 (2013.01); G02B 3/005 (2013.01); G02B 3/0062 (2013.01);
(Continued)

(58) Field of Classification Search
CPC ...... G02B 13/26; G02B 3/005; G02B 3/0062; G02B 3/0075
(Continued)

(56) References Cited

U.S. PATENT DOCUMENTS 4,270,047 A * 5/1981 Mochizuki ............. G02B 3/005
250/208.1
6,693,748 B1 2/2004 Fujimoto et al.
(Continued)

FOREIGN PATENT DOCUMENTS

JP    2000-295445 A    10/2000
JP    2001-352429 A    12/2001
(Continued)

OTHER PUBLICATIONS

International Search Report for PCT/JP2014/001033 dated May 27, 2014.
(Continued)

*Primary Examiner* — Zachary Wilkes
(74) *Attorney, Agent, or Firm* — Studebaker & Brackett PC

(57) ABSTRACT

The depth of field of an erecting equal-magnification lens array unit as a whole is expanded. An erecting equal-magnification lens array unit (13) includes a first lens array (17) and a second lens array (18). The first lens array (17) includes a plurality of first lenses (20). The first lenses are arranged in the first lens array (17) along a first direction. The first direction is perpendicular to the optical axes of the first lenses (20). The second lens array (18) includes a plurality of second lenses. The optical axes of the second lenses overlap with the optical axes of the first lenses. The second lenses are arranged in the second lens array (18) along the first direction. Each first lens (20) and second lens with overlapping optical axes form an optical system.

3 Claims, 14 Drawing Sheets

(51) Int. Cl.
*G02B 27/00* (2006.01)
*G02B 3/00* (2006.01)

(52) U.S. Cl.
CPC ........... *G02B 3/0075* (2013.01); *G02B 13/22* (2013.01); *G02B 27/0075* (2013.01)

(58) Field of Classification Search
USPC .......................................... 358/474; 359/619
See application file for complete search history.

(56) References Cited

U.S. PATENT DOCUMENTS

| | | | |
|---|---|---|---|
| 7,898,738 B2* | 3/2011 | Yamamura | B29D 11/00278 359/622 |
| 8,259,395 B2 | 9/2012 | Shiraishi | |
| 8,488,214 B2 | 7/2013 | Kaise | |
| 8,638,484 B2 | 1/2014 | Nagata et al. | |
| 8,786,656 B2* | 7/2014 | Kim | G02B 3/005 347/241 |
| 9,007,692 B2 | 4/2015 | Shiraishi | |
| 9,354,360 B2* | 5/2016 | Sugita | G02B 13/22 |
| 2001/0028506 A1 | 10/2001 | Fujimoto et al. | |
| 2010/0177401 A1 | 7/2010 | Shiraishi | |
| 2010/0238520 A1* | 9/2010 | Nagata | G02B 3/0062 359/622 |
| 2011/0249304 A1 | 10/2011 | Kaise | |
| 2012/0229878 A1 | 9/2012 | Nagata et al. | |
| 2013/0100506 A1 | 4/2013 | Shiraishi | |

FOREIGN PATENT DOCUMENTS

| | | |
|---|---|---|
| JP | 2006-014081 A | 1/2006 |
| JP | 2010-164974 A | 7/2010 |
| JP | 2010-286741 A | 12/2010 |
| JP | 2011-223190 A | 11/2011 |
| JP | 2012-078834 A | 4/2012 |
| JP | 2012-185390 A | 9/2012 |
| JP | 2013-088662 A | 5/2013 |

OTHER PUBLICATIONS

Written Opinion for PCT/JP2014/001033 dated May 27, 2014 with English translation of Concise Explanation.

* cited by examiner

Object surface at ideal position

Object surface displaced from ideal position

ERECTING EQUAL-MAGNIFICATION LENS ARRAY UNIT, IMAGE READING DEVICE AND IMAGE FORMING DEVICE

TECHNICAL FIELD

This disclosure relates to an erecting equal-magnification lens array unit used in an image reading device such as a scanner, facsimile, or the like, and in an image forming device such as an LED printer or the like.

BACKGROUND

An optical reduction system or an erecting equal-magnification optical system is used in an image reading device, such as a scanner, facsimile, or the like, and in an image forming device, such as an LED printer or the like. In particular, as compared to when using an optical reduction system, a characteristic of an erecting equal-magnification optical system is the ease with which the entire device can be made compact.

Erecting equal-magnification optical systems have been formed by inserting rod-like lenses such as Selfoc lenses (registered trademark) or rod lenses into opaque black resin in the form of an array. Since each lens has erecting equal-magnification properties, the erecting equal-magnification properties are maintained even after the lenses are arranged as an array.

By varying the refractive power from the center of the rod towards the periphery, the above-described Selfoc (registered trademark) lenses or rod lenses are provided with light-harvesting properties. Since these lenses need to be manufactured with a special method as compared to regular lenses, manufacturing is difficult and expensive. An erecting equal-magnification optical system using a lens array plate with convex surfaces arranged in an array has therefore been proposed (see JP 2006-014081 A (PTL 1)).

Furthermore, with an erecting equal-magnification optical system using Selfoc (registered trademark) lenses, the depth of field is narrow. In an image reading device such as a scanner, by placing an object for which an image will be read on a cover glass that is maintained at a constant distance from the optical system, the distance between the object for which the image will be read and the optical system is maintained at a desired distance. By thus maintaining the distance between the object and the optical system at the desired distance, it is possible to read an image with little blurring even with a narrow depth of field.

Depending on the object to be read, however, the read surface might not be in close contact with the cover glass, but rather might be separated therefrom. In such a case, the read image is highly blurred due to the narrow depth of field. An erecting equal-magnification optical system with an expanded depth of field has therefore been proposed (see JP 2010-164974 A (PTL 2)).

CITATION LIST

Patent Literature

PTL 1: JP 2006-014081 A
PTL 2: JP 2010-164974 A

SUMMARY

Technical Problem

While the depth of field of individual lenses is intentionally expanded in the erecting equal-magnification lens array in PTL 2, the effect of the surrounding erecting equal-magnification lenses that are arranged in an array is not taken into consideration. Therefore, even if the change in distance from the optical system to the object is within the range of the depth of field, a problem remains in that visible degradation occurs in the read image.

It could therefore be helpful to provide an erecting equal-magnification lens array unit, image reading device, and image forming device that can be formed using regular lenses and that expand the overall depth of field.

Solution to Problem

In order to resolve the above issues, an exemplary erecting equal-magnification lens array unit includes:

a first lens array including a plurality of first lenses, the first lenses being arranged along a first direction perpendicular to optical axes of the first lenses;

a second lens array including a plurality of second lenses, optical axes of the second lenses overlapping with optical axes of the first lenses, the second lenses being arranged along the first direction; and a light blocking portion between each first lens and each second lens with overlapping optical axes, an aperture being formed in the light blocking portion near a second surface of the first lens, wherein each optical system formed by each first lens, the aperture, and each second lens with overlapping optical axes is an erecting equal-magnification optical system, and the following expressions are satisfied:

$$\left| \frac{r_{11}}{L_1} - \frac{n-1}{n} \right| \leq 0.2,$$

$$r_{11} \geq 0.9p,$$

$$r_{11} \geq 10\beta_1^2 + 5.7\beta_1 + 1.3,$$

$$r_{11} \leq -5.5r_{12} - 0.035p, \text{ and}$$

$$r_{11} \geq \frac{1}{p} \cdot (0.6r_{12}^2 + 0.2pr_{12} + 0.9p^2),$$

where $r_{11}$ is a curvature radius of a first surface of the first lens, $L_1$ is a thickness of the first lens, n is a refractive index of the first lens, $r_{12}$ is a curvature radius of a second surface of the first lens, $\beta_1$ is a magnification of the first lens, and p is a lens pitch of the lens array.

In order to resolve the above issues, an exemplary erecting equal-magnification lens array unit includes:

a first lens array including a plurality of first lenses, the first lenses being arranged along a first direction perpendicular to optical axes of the first lenses;

a second lens array including a plurality of second lenses, optical axes of the second lenses overlapping with optical axes of the first lenses, the second lenses being arranged along the first direction; and a light blocking portion between each first lens and each second lens with overlapping optical axes, an aperture being formed in the light blocking portion near a second surface of the first lens, wherein each optical system formed by each first lens, the aperture, and each second lens with overlapping optical axes is an erecting equal-magnification optical system, and the following expressions are satisfied:

$$\left| \frac{r_{11}}{L_1} - \frac{n-1}{n} \right| \leq 0.2,$$

-continued $$\frac{f_1^2}{L_0 + f_1 - 2} \le L_{12}, \text{ and}$$

$$4 \le L_0/p \le 7,$$

where $r_{11}$ is a curvature radius of a first surface of the first lens, $L_1$ is a thickness of the first lens, n is a refractive index of the first lens, $L_0$ is an object distance (distance between an object and the first surface of the first lens), $f_1$ is a focal length of the first lens, $L_{12}$ is an interval between the first lens and the second lens, and p is a lens pitch of the lens array.

In order to resolve the above issues, an exemplary image reading device is provided with an erecting equal-magnification lens array unit that includes: a first lens array including a plurality of first lenses, the first lenses being arranged along a first direction perpendicular to optical axes of the first lenses; a second lens array including a plurality of second lenses, optical axes of the second lenses overlapping with optical axes of the first lenses, the second lenses being arranged along the first direction; and a light blocking portion between each first lens and each second lens with overlapping optical axes, an aperture being formed in the light blocking portion near a second surface of the first lens, wherein each optical system formed by each first lens, the aperture, and each second lens with overlapping optical axes is an erecting equal-magnification optical system, and the following expressions are satisfied:

$$\left| \frac{r_{11}}{L_1} - \frac{n-1}{n} \right| \le 0.2,$$

$$r_{11} \ge 0.9p,$$

$$r_{11} \ge 10\beta_1^2 + 5.7\beta_1 + 1.3,$$

$$r_{11} \le -5.5r_{12} - 0.035p, \text{ and}$$

$$r_{11} \ge \frac{1}{p} \cdot (0.6r_{12}^2 + 0.2pr_{12} + 0.9p^2),$$

where $r_{11}$ is a curvature radius of a first surface of the first lens, $L_1$ is a thickness of the first lens, n is a refractive index of the first lens, $r_{12}$ is a curvature radius of a second surface of the first lens, $\beta_1$ is a magnification of the first lens, and p is a lens pitch of the lens array.

In order to resolve the above issues, an exemplary image reading device is provided with an erecting equal-magnification lens array unit that includes: a first lens array including a plurality of first lenses, the first lenses being arranged along a first direction perpendicular to optical axes of the first lenses; a second lens array including a plurality of second lenses, optical axes of the second lenses overlapping with optical axes of the first lenses, the second lenses being arranged along the first direction; and a light blocking portion between each first lens and each second lens with overlapping optical axes, an aperture being formed in the light blocking portion near a second surface of the first lens, wherein each optical system formed by each first lens, the aperture, and each second lens with overlapping optical axes is an erecting equal-magnification optical system, and the following expressions are satisfied:

$$\left| \frac{r_{11}}{L_1} - \frac{n-1}{n} \right| \le 0.2,$$

$$\frac{f_1^2}{L_0 + f_1 - 2} \le L_{12}, \text{ and}$$

$$4 \le L_0/p \le 7,$$

where $r_{11}$ is a curvature radius of a first surface of the first lens, $L_1$ is a thickness of the first lens, n is a refractive index of the first lens, $L_0$ is an object distance (distance between an object and the first surface of the first lens), $f_1$ is a focal length of the first lens, $L_{12}$ is an interval between the first lens and the second lens, and p is a lens pitch of the lens array.

In order to resolve the above issues, an exemplary image forming device is provided with an erecting equal-magnification lens array unit that includes: a first lens array including a plurality of first lenses, the first lenses being arranged along a first direction perpendicular to optical axes of the first lenses; a second lens array including a plurality of second lenses, optical axes of the second lenses overlapping with optical axes of the first lenses, the second lenses being arranged along the first direction; and a light blocking portion between each first lens and each second lens with overlapping optical axes, an aperture being formed in the light blocking portion near a second surface of the first lens, wherein each optical system formed by each first lens, the aperture, and each second lens with overlapping optical axes is an erecting equal-magnification optical system, and the following expressions are satisfied:

$$\left| \frac{r_{11}}{L_1} - \frac{n-1}{n} \right| \le 0.2,$$

$$r_{11} \ge 0.9p,$$

$$r_{11} \ge 10\beta_1^2 + 5.7\beta_1 + 1.3,$$

$$r_{11} \le -5.5r_{12} - 0.035p, \text{ and}$$

$$r_{11} \ge \frac{1}{p} \cdot (0.6r_{12}^2 + 0.2pr_{12} + 0.9p^2),$$

where $r_{11}$ is a curvature radius of a first surface of the first lens, $L_1$ is a thickness of the first lens, n is a refractive index of the first lens, $r_{12}$ is a curvature radius of a second surface of the first lens, $\beta_1$ is a magnification of the first lens, and p is a lens pitch of the lens array.

In order to resolve the above issues, an exemplary image forming device is provided with an erecting equal-magnification lens array unit that includes: a first lens array including a plurality of first lenses, the first lenses being arranged along a first direction perpendicular to optical axes of the first lenses; a second lens array including a plurality of second lenses, optical axes of the second lenses overlapping with optical axes of the first lenses, the second lenses being arranged along the first direction; and a light blocking portion between each first lens and each second lens with overlapping optical axes, an aperture being formed in the light blocking portion near a second surface of the first lens, wherein each optical system formed by each first lens, the aperture, and each second lens with overlapping optical axes is an erecting equal-magnification optical system, and the following expressions are satisfied:

$$\left|\frac{r_{11}}{L_1} - \frac{n-1}{n}\right| \leq 0.2,$$

$$\frac{f_1^2}{L_0 + f_1 - 2} \leq L_{12}, \text{ and}$$

$$4 \leq L_0/p \leq 7,$$

where $r_{11}$ is a curvature radius of a first surface of the first lens, $L_1$ is a thickness of the first lens, n is a refractive index of the first lens, $L_0$ is an object distance (distance between an object and the first surface of the first lens), $f_1$ is a focal length of the first lens, $L_{12}$ is an interval between the first lens and the second lens, and p is a lens pitch of the lens array.

Advantageous Effect

The erecting equal-magnification lens array unit, image reading device, and image forming device with the above-described structure allow for the provision of substantial telecentricity on at least the object side in each optical element. Therefore, even if the distance from the erecting equal-magnification lens array unit to the object changes, it is possible to form an image in which the occurrence of blurring is suppressed.

DETAILED DESCRIPTION

With reference to the drawings, the following describes embodiments of an erecting equal-magnification lens array unit.

Embodiment 1

Figure 1:
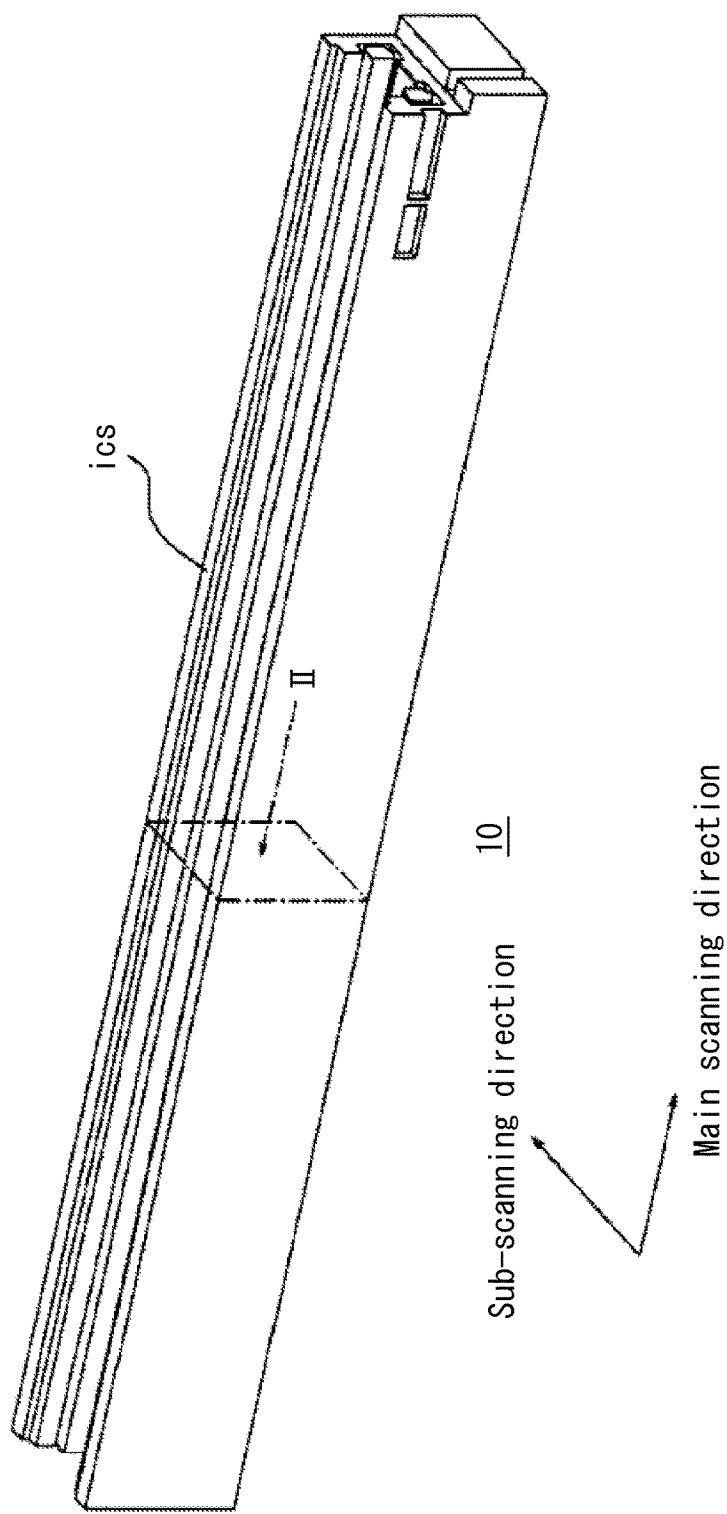
FIG. 1 is a perspective view illustrating the outer appearance of an image reading unit having an erecting equal-magnification lens array unit according to Embodiment 1.

FIG. 1 is a perspective view of an image reading unit 10 that includes an erecting equal-magnification lens array unit according to Embodiment 1. The image reading unit 10 is, for example, used in an image scanner. The image reading unit 10 can read an image, in a straight line along a main scanning direction, of a subject placed on an image reading surface ics. By consecutively reading the image in a straight line while displacing the image reading unit 10 in a sub-scanning direction perpendicular to the main scanning direction, a 2D image of the subject is read.

Figure 2:
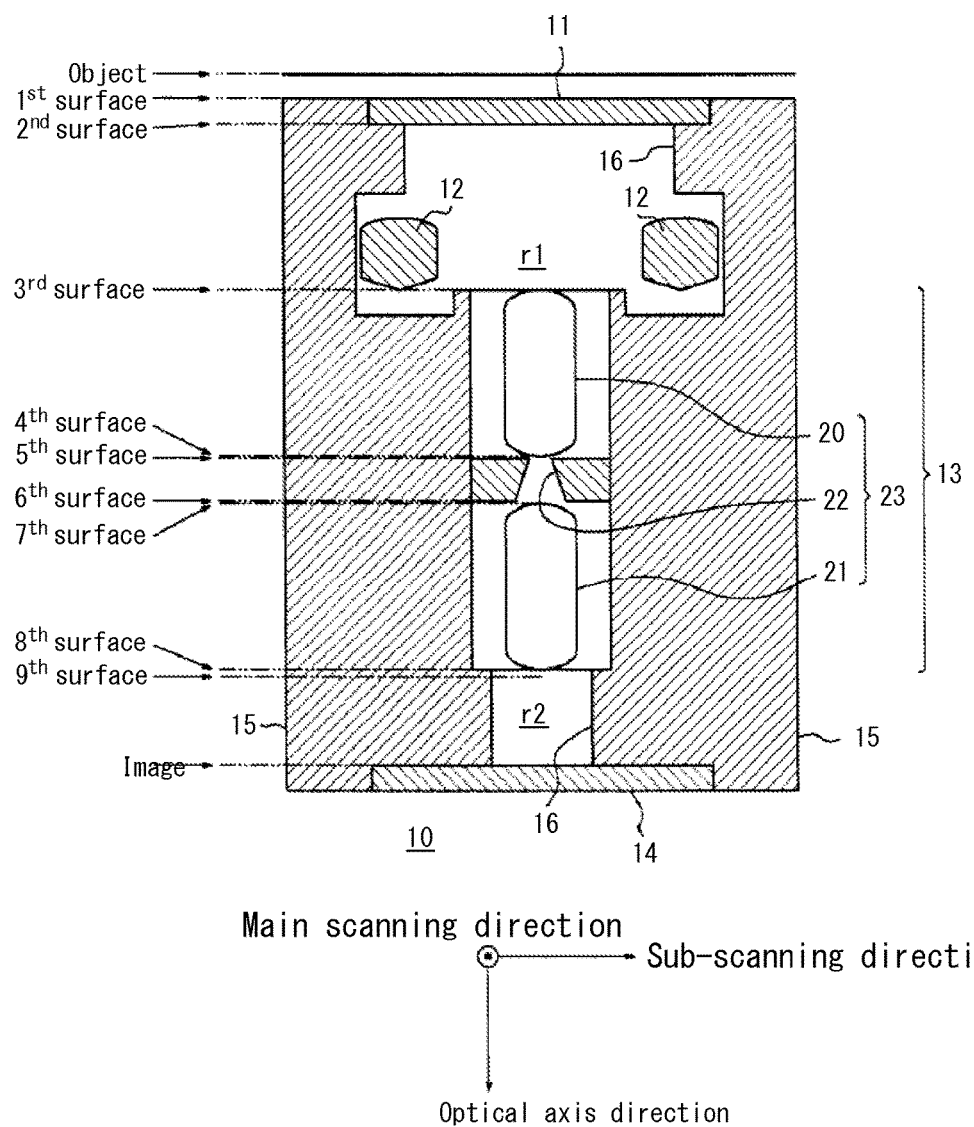
FIG. 2 is a cross-sectional diagram of the image reading unit along a plane perpendicular to the main scanning direction in FIG. 1.

Next, with reference to FIG. 2, the structure of the image reading unit 10 is described. FIG. 2 schematically illustrates a cross-section of the portion indicated by a line with alternate long and two short dashes in FIG. 1, in a plane perpendicular to the main scanning direction. Unlike FIG. 1, a cover glass 11 is provided. Note that in FIG. 2, the direction from the background toward the foreground is the main scanning direction, and the direction from the left to the right is the sub-scanning direction. The direction from the top to the bottom in FIG. 2 is the optical axis direction.

The image reading unit 10 includes a cover glass 11, an illumination system 12, an erecting equal-magnification lens array unit 13, an image sensor 14, and a position regulating member 15. The cover glass 11, illumination system 12, erecting equal-magnification lens array unit 13, and image sensor 14 are fixed by the position regulating member 15 so that their relative positions and orientations are maintained in the states described below.

A hole 16 is formed in the position regulating member 15. The hole 16 includes a first chamber r1 and a second chamber r2. The first chamber r1 is formed to have a greater width in the sub-scanning direction than that of the second chamber r2.

The cover glass 11 covers the end of the hole 16 at the side of the first chamber r1. The illumination system 12 is placed in the first chamber r1. Note that the illumination system 12 is placed at a position that does not overlap the second chamber r2 when viewed from the optical axis direction. The illumination system 12 is established so that illumination light emitted by the illumination system 12 is emitted in the direction of the cover glass 11. In other words, the orientation and position are determined for a light source or illumination optical system with which the illumination system 12 is configured.

The erecting equal-magnification lens array unit 13 is inserted in the second chamber r2. The image sensor 14 is fixedly attached to the end of the hole 16 at the side of the second chamber r2.

Note that orientations are adjusted so that a normal line to the plane of the cover glass 11 is parallel to the optical axis of each optical system provided in the erecting equal-magnification lens array unit 13, and so that a normal line to the receiving surface of the image sensor 14 is parallel to the optical axis direction.

In the above-described structure, illumination light emitted from the illumination system 12 strikes the subject through the cover glass 11. Reflected light due to the subject reflecting the illumination light passes through the cover glass 11. The reflected light from the subject forms an image on the receiving surface of the image sensor 14 via the erecting equal-magnification lens array unit 13. The formed optical image is captured by the image sensor 14, and an image signal, which is an electrical signal, is generated.

Note that the image sensor 14 is, for example, a CCD line sensor, a CMOS line sensor, or the like and generates a 1D image signal. The generated 1D image signal is transmitted to a signal processing circuit, and predetermined image processing is applied thereto. By generating 1D image signals for a plurality of frames generated while displacing the image reading unit 10 in the sub-scanning direction, a 2D image signal is generated.

Figure 3:
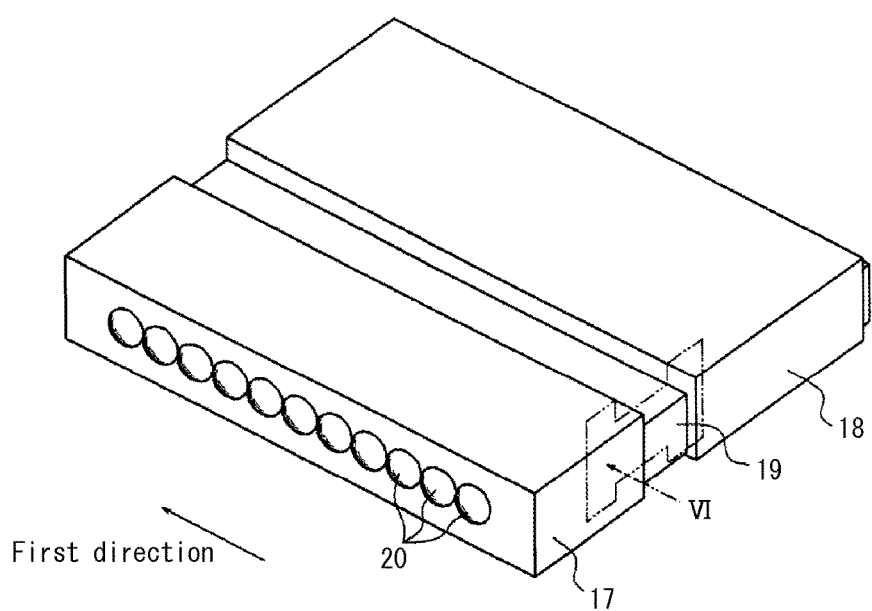
FIG. 3 is a perspective view illustrating the outer appearance of the erecting equal-magnification lens array unit.

Next, the structure of the erecting equal-magnification lens array unit is described in detail with reference to FIG. 3. The erecting equal-magnification lens array unit 13 is configured with a first lens array 17, a second lens array 18, and a connecting portion 19 (light blocking portion).

A plurality of first lenses 20 are provided in the first lens array 17. The orientations of the first lenses 20 are determined so that the optical axes thereof are parallel to each other. Furthermore, the first lenses 20 are arranged to be in close contact to each other along a first direction perpendicular to the optical axes of the first lenses 20.

A plurality of second lenses 21 (see FIG. 2) are provided in the second lens array 18. The orientations of the second lenses 21 are determined so that the optical axes thereof are parallel to each other. Furthermore, the second lenses 21 are arranged in a line along a direction perpendicular to the optical axes of the second lenses 21.

The first lens array 17 and the second lens array 18 are connected by the connecting portion 19. The positions of the first lens array 17 and the second lens array 18 are aligned so that the optical axis of each first lens 20 overlaps with the optical axis of one of the second lenses 21.

A plurality of light-transmitting holes (apertures) 22 are formed in the connecting portion 19. The light-transmitting holes 22 penetrate from each of the first lenses 20 to the second lenses 21. Note that the surface of the connecting portion 19 at the side of the first lens 20 functions as a diaphragm, blocking light entering from a surface other than the light-transmitting hole 22. Accordingly, the first lens 20, light-transmitting hole 22, and second lens 21 form a unit optical system 23.

The first lenses 20 and the second lenses 21 are designed and the unit optical systems 23 are structured so that each unit optical system 23 is an erecting equal-magnification optical system and is substantially telecentric on the object side. The condition for being substantially telecentric is described below.

In this embodiment, both surfaces of the first lens 20 and the second lens 21 are formed to be convex surfaces, so that the unit optical systems 23 are provided with erecting equal-magnification properties.

Furthermore, the first lens 20 is designed and formed so that Expressions (1) to (5) below are satisfied.

$$\left| \frac{r_{11}}{L_1} - \frac{n-1}{n} \right| \leq 0.2 \quad (1)$$

$$r_{11} \geq 0.9p \quad (2)$$

$$r_{11} \geq 10\beta_1^2 + 5.7\beta_1 + 1.3 \quad (3)$$

$$r_{11} \leq -5.5r_{12} - 0.035p \quad (4)$$

$$r_{11} \geq \frac{1}{p} \cdot (0.6r_{12}^2 + 0.2pr_{12} + 0.9p^2) \quad (5)$$

In the above Expressions, $r_{11}$ is the curvature radius of a first surface of the first lens 20, $L_1$ is the thickness of the first lens 20, n is the refractive index of the first lens 20, $r_{12}$ is the curvature radius of a second surface of the first lens 20, $\beta_1$ is the magnification of the first lens 20, and p is the lens pitch of the lens array.

Furthermore, each unit optical system 23 is designed and formed so that Expression (6) below is satisfied.

$$\tan\theta_g < \frac{\delta}{\Delta z} \quad (6)$$

Figure 4:
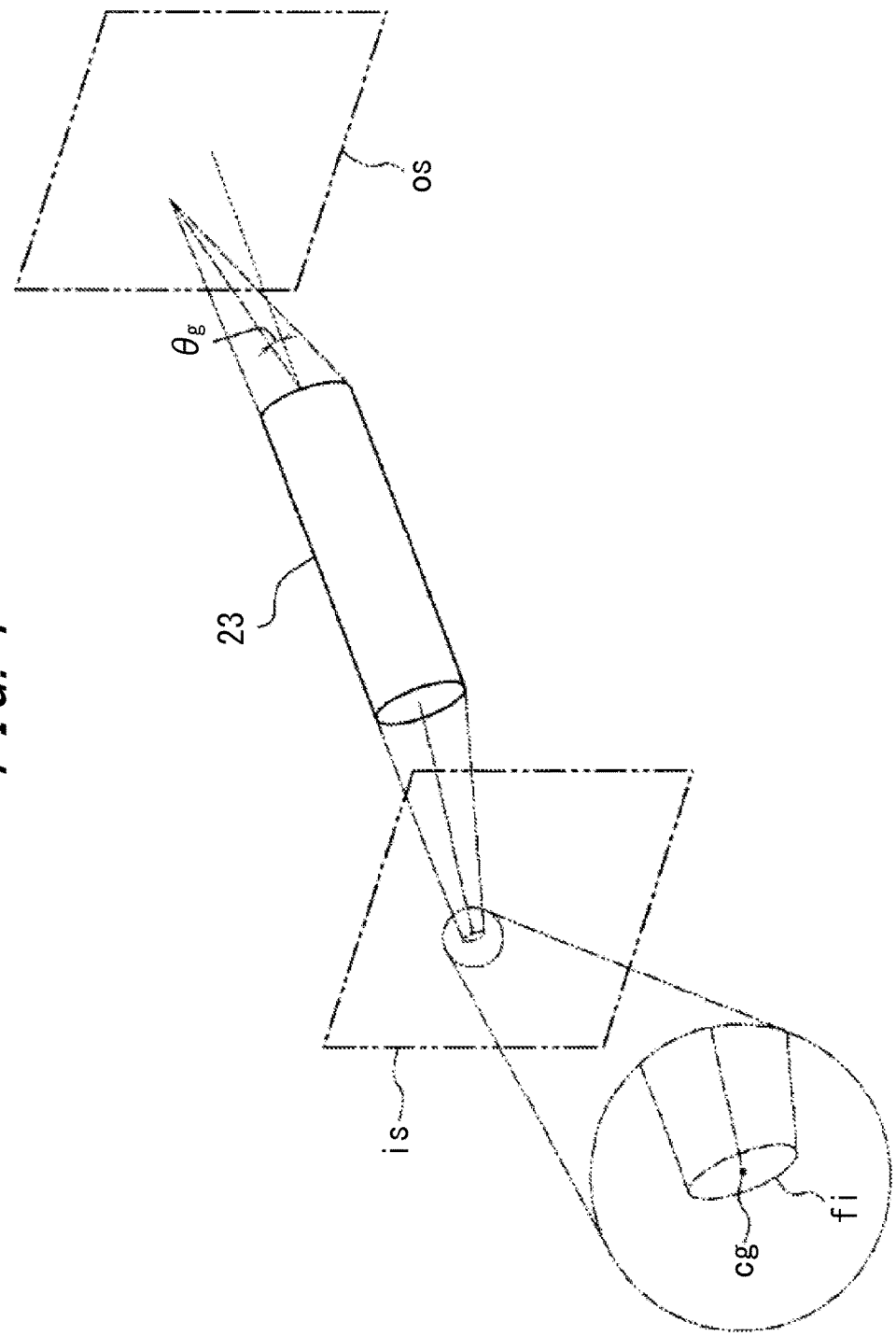
FIG. 4 illustrates the definition of $\theta_g$ with respect to the unit optical system.
Figure 5:
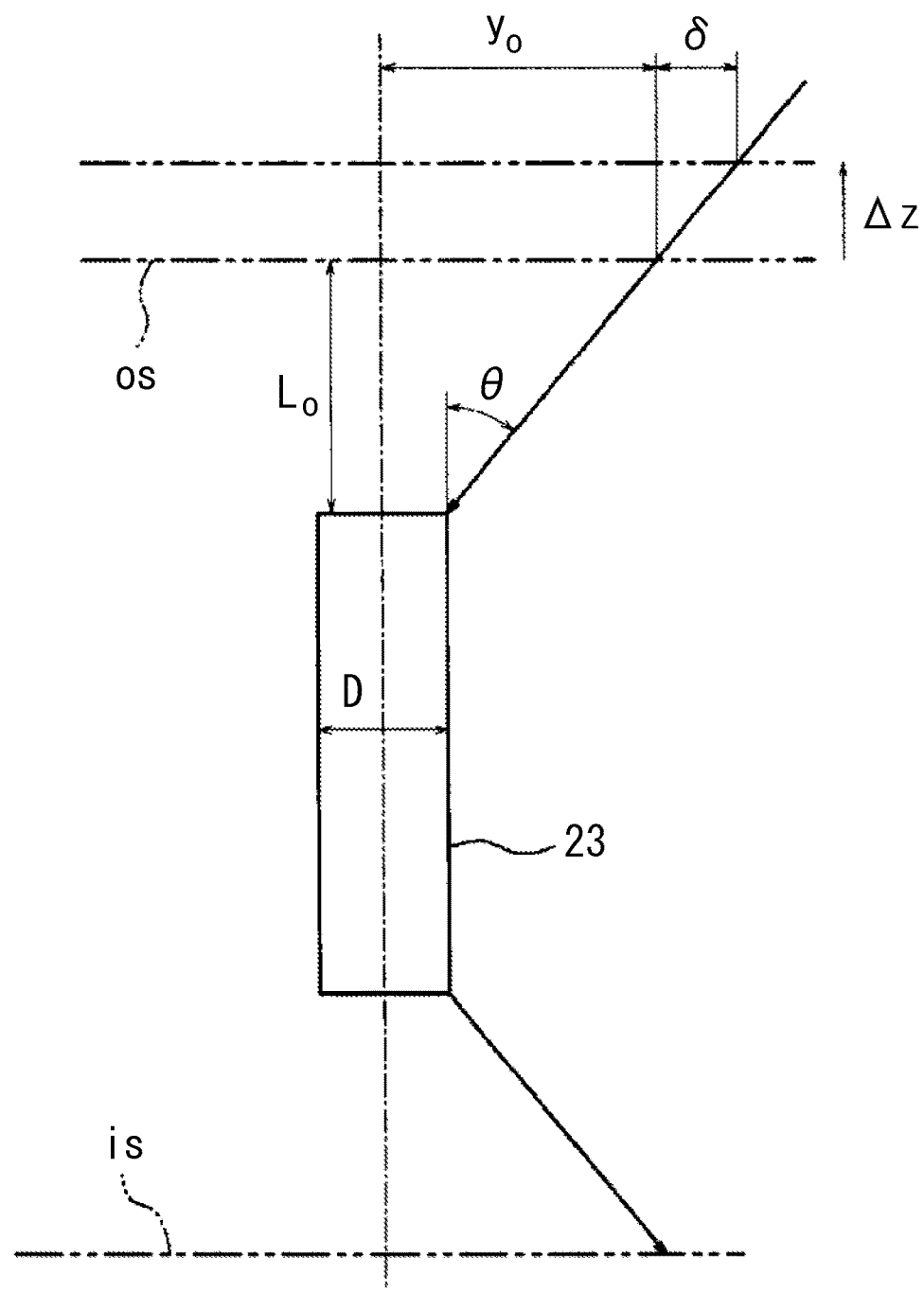
FIG. 5 illustrates the positional relationships between a unit optical system, an image surface, and an object surface.

As illustrated in FIG. 4, $\theta_g$ is the angle of incidence into the unit optical system 23 of a light ray that passes through the center of gravity cg of a fine optical image fi, which is an image formed on an image surface is by the unit optical system 23 for a point on the object surface os. As illustrated in FIG. 5, δ is an allowable image shift amount determined in advance for the unit optical system 23. When the object is displaced by the depth of field ΔZ from the unit optical system 23, the image shift amount refers to the amount of displacement, in a direction perpendicular to the optical axis of the unit optical system 23, of a point on the object surface os that causes an image to form at any point on the image surface is.

For example, when using the erecting equal-magnification lens array unit 13 as a photography optical system of the image sensor 14, and the image shift amount δ is equal to or less than the pixel pitch, then no blurring will be noticeable in the captured image as a result of misalignment of formed image points on the image surface is corresponding to the same point on the object due to different unit optical systems 23. Accordingly, the allowable image shift amount δ may be determined in accordance with the image sensor, light receiver, or the like that is used, or in accordance with the amount of misalignment that can be perceived by humans.

Furthermore, each unit optical system 23 is designed and formed so that Expression (7) below is satisfied.

$$0.5 \leq \frac{y_0}{D} \leq 1.0 \quad (7)$$

Note that $y_0$ is the field of view radius of the unit optical system 23, i.e. the radius of the range on the object surface os of light that can be captured by the unit optical system 23. The distance $L_0$ from the unit optical system 23 to the object surface os is determined in advance. The image scanner is formed so that the distance from the glass surface, on which lies a document that is to be scanned, to the unit optical system 23 is the determined distance $L_0$. D is the diameter of the unit optical system 23.

Furthermore, each unit optical system 23 is designed and formed so that Expression (8) below is satisfied.

$$\frac{D}{8 \times L_0} < \tan\theta_g \quad (8)$$

Here, $L_0$ is a predetermined object distance from the unit optical system 23 to the object surface os.

Figure 6:
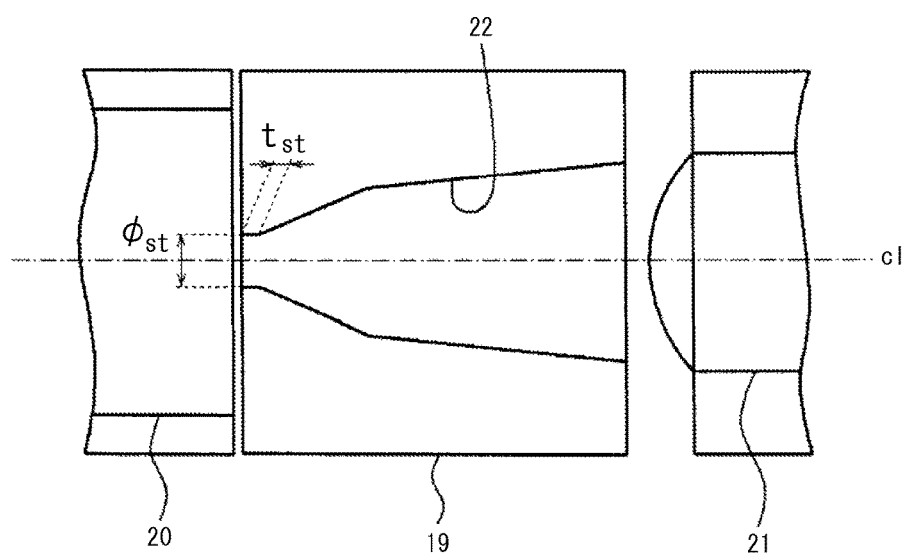
FIG. 6 is a partial cross-sectional diagram of the unit optical system along a plane perpendicular to the first direction in FIG. 3.

Next, the shape of the light-transmitting holes 22 is described in detail. As illustrated in FIG. 6, the inner surface of each light-transmitting hole 22 is formed along the edge of two consecutive circular truncated cones having the same center line c1. The light-transmitting holes 22 are formed so that the diameter of each light-transmitting hole 22 at the first lens 20 side is smaller than the diameter at the second lens 21 side. The formation position of each light-transmitting hole 22 is determined so that the center line c1 overlaps the optical axis of the first lens 20 and the second lens 21.

Furthermore, treatment to suppress reflection of light or treatment to absorb light is applied to the inner surface of each light-transmitting hole 22. Examples of treatment to suppress reflection of light include treatment to roughen the surface by sandblasting or the like, referred to as surface texturing, and treatment to suppress the progress of reflected light rays by forming the surface in a screw shape. Examples of treatment to absorb light include applying light-absorbing paint to the inner surface.

According to the erecting equal-magnification lens array unit of this embodiment with the above structure, an erecting equal-magnification lens array unit formable using regular lenses and having an expanded depth of field for the array as a whole can be formed. The effect of expanding the depth of field for the array as a whole is described in detail below.

Figure 7A:
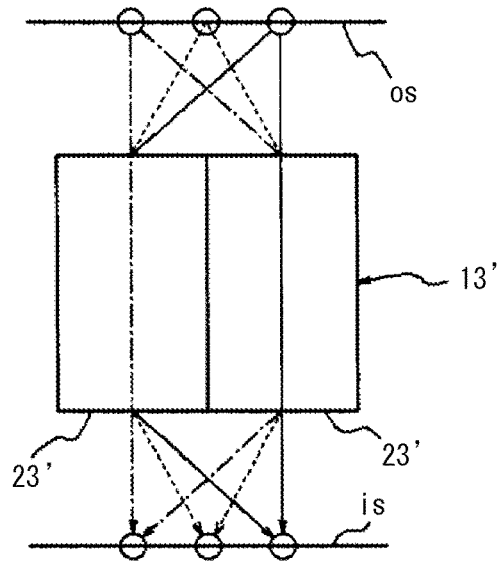
FIGS. 7(a) and 7(b) illustrate the change in imaging position along the image surface when the object surface is displaced from the ideal position in a typical erecting equal-magnification lens array unit.

As illustrated in FIG. 7(a), in a typical erecting equal-magnification lens array unit 13', for an object placed at a position on an object surface os that is ideal with respect to the distance to the image surface is, an erected image is formed at equal magnification on the image surface is by each unit optical system 23'. The images formed by the plurality of unit optical systems 23' are output as one overall image, without any misalignment (see FIG. 7(a)).

Figure 7B:
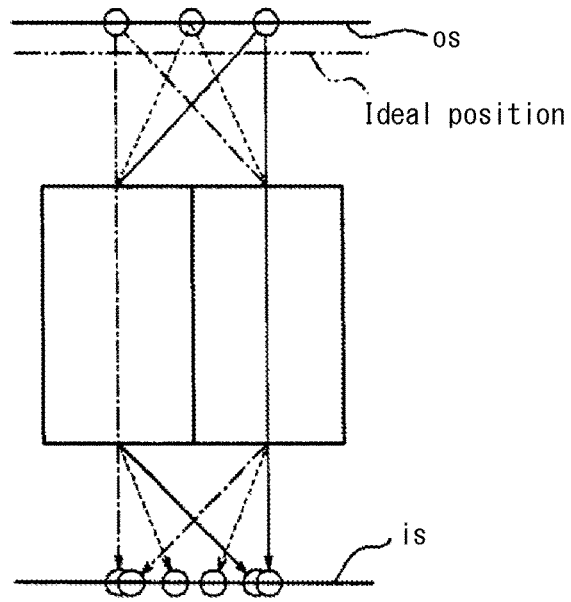
Figure 8:
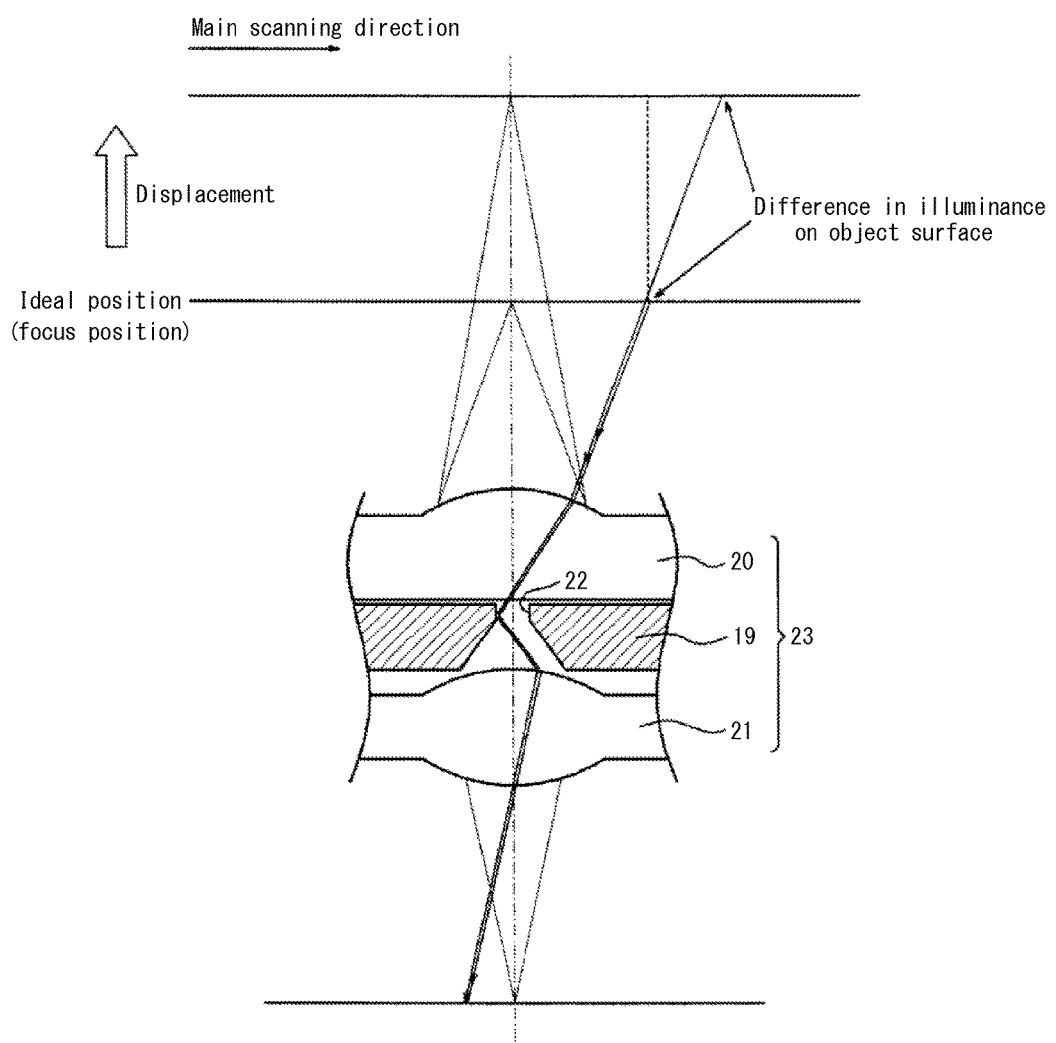
FIG. 8 illustrates the path of a flare caused by a light-transmitting hole that functions as an aperture stop.

As illustrated in FIG. 7(b), however, if the object surface os is displaced from the ideal position, the equal-magnification properties of the image surface is of each unit optical system 23' degenerate, and the imaging position on the image surface is for the same point on the object surface os differs between adjacent unit optical systems 23'. Therefore, the image output by the erecting equal-magnification lens array unit 13' as a whole is distorted. Accordingly, the depth of field of the erecting equal-magnification lens array unit 13' as a whole becomes shallower.

In general, as the angle of incidence of the main light ray at the object side increases, the change in magnification of the lens with respect to displacement of the object surface os increases. In the erecting equal-magnification lens array unit as a whole, the misalignment between imaging positions, by adjacent lenses, for the same point on the object surface os increases as the change in magnification increases.

Therefore, ideally, if the angle of incidence of the main light ray is zero, the magnification does not change with respect to displacement of the object surface os. Accordingly, even if the object surface os is displaced from the ideal position, the imaging position by different lenses for a point on the object surface os is maintained at the same position on the image surface is without shifting. In other words, if each optical system forming the lens array is object-side telecentric, a deep depth of field for the lens array as a whole can be maintained. In this way, with the erecting equal-magnification lens array unit 13 of this embodiment, the depth of field for the lens array as a whole can be made deeper.

In this embodiment, by forming the first lenses 20 to satisfy Expression (1), each unit optical system 23 is provided with telecentricity on the object side, as described below.

In order to make the unit optical system 23 telecentric on the object side, the back focal point of the first lens 20 and the position of the diaphragm need to be caused to coincide. The back focal position of the first lens 20 is substantially equivalent to the imaging position by the first lens 20 of an object at infinity. A small diameter region of the light-transmitting hole 22 functions as the aperture of the diaphragm of the unit optical system 23.

Therefore, in order for the unit optical system 23 to be telecentric on the object side, the imaging position for infinity of the first lens 20 and the position of the small diameter region of the light-transmitting hole 22 need to be caused to coincide.

The small diameter region of the light-transmitting hole 22, as described below, is preferably located on or near the second surface of the first lens 20. Accordingly, when the small diameter region of the light-transmitting hole 22 is located near the second surface of the first lens 20, it is possible to provide the unit optical system 23 with telecentricity on the object side by making the imaging position for infinity of the first lens 20 substantially coincide with the second surface of the first lens 20.

The conditions for making the imaging position for infinity coincide with the second surface of the first lens 20 are established as follows. As the geometrical-optical relationship on either side of the first surface of the first lens 20, Expression (9) holds by Abbe's invariant.

$$\frac{n}{s_1} = \frac{1}{s_0} + \frac{n-1}{r_{11}} \quad (9)$$

In Expression (9), $s_0$ is the distance between the object and the first surface of the first lens 20. Furthermore, $s_1$ is the distance between the first surface of the first lens 20 and the imaging position of light emitted from the first surface of the first lens 20.

Since the imaging position of an object at infinity is established, setting $s_0$ to infinity allows Expression (9) to be transformed to Expression (10).

$$\frac{r_{11}}{s_1} - \frac{n-1}{n} = 0 \quad (10)$$

When Expression (10) is satisfied, the position at a distance $s_1$ from the first surface of the first lens 20 is the imaging position for infinity of the first lens 20 for which the curvature radius of the first surface is $r_{11}$. Accordingly, in order for the first lens 20 to form an image of an object at infinity on the second surface of the first lens 20, Expression (11) needs to be satisfied.

$$\frac{r_{11}}{L_1} - \frac{n-1}{n} = 0 \quad (11)$$

Even if Expression (11) is not strictly satisfied, however, if the absolute value of the left side of Expression (11) is equal to or less than an acceptable value that can be considered substantially to be zero, then the second surface of the first lens 20 can substantially be caused to coincide with the imaging position for infinity. Note that the left side of Expression (11) not only influences adjustment of the imaging position for infinity, but also the magnification of the first lens 20. Therefore, the acceptable value is established taking into consideration adjustment of the imaging position for infinity and the magnification of the first lens 20.

As the absolute value of the left side of Expression (11) increases, the imaging position for infinity is spaced farther away from the second surface of the first lens 20. As the imaging position for infinity is spaced farther away, the telecentricity of the first lens 20 on the object side is reduced. If the acceptable value is 0.3, i.e. if the absolute value of the left side of Expression (11) is 0.3 or less, the telecentricity of the first lens 20 on the object side is maintained.

As the absolute value of the left side of Expression (11) increases, the magnification of the first lens 20 increases. In this embodiment, the first lens 20 is preferably an optical reduction system, i.e. the magnification is preferably less than one. The reason is that the first lens 20 and the second lens 21 are used to configure the unit optical system 23 so as to have erecting equal-magnification properties.

The need for the magnification of the first lens 20 to be less than one is now described in further detail. Since the magnification of the unit optical system 23 is one, the product of the magnification of the first lens 20 and the second lens 21 that configure the unit optical system 23 is one. Accordingly, one of the first lens 20 and the second lens 21 needs to be an optical reduction system, and the other an optical expansion system. As described above, the first lenses 20 are arranged to be in close contact to each other along the first direction (see FIG. 3). Accordingly, in order for the first lenses 20 to be in close contact to each other, it is an essential requirement that the first lenses 20 be optical reduction systems.

When the absolute value of the left side of Expression (11) is less than 0.2, the magnification of the first lens 20 is less than one. Therefore, the acceptable value that takes into consideration the magnification of the first lens 20 is calculated as 0.2.

Accordingly, taking into consideration both the requirement of the imaging position for infinity and the magnification of the first lens 20, the acceptable value used for the absolute value of the left side of Expression (11) is preferably 0.2. Setting the acceptable value to 0.2 yields Expression (1).

Next, the reason why the small diameter region of the light-transmitting hole 22 is preferably located on or near the second surface of the first lens 20 is described.

Between the first lens 20 and the second lens 21, it is necessary to provide a light shielding wall to prevent stray light from one unit optical system 23 to another unit optical system 23, as well as a diaphragm for adjusting brightness. In this embodiment, the inner wall of the light-transmitting hole 22 formed in the connecting portion 19 can function as a light shielding wall. Accordingly, the diaphragm is placed between the first lens 20 and the connecting portion 19 or between the connecting portion 19 and the second lens 21.

However, dust may adhere to the second surface of the first lens 20 and the first surface of the second lens 21. If dust adheres, the amount of light of the subject image reaching the image sensor 14 is reduced. In order to reduce the influence of dust in so far as possible, the light beams that pass through the second surface of the first lens 20 and the first surface of the second lens 21, to which dust can adhere, are preferably made as large as possible.

In order to satisfy such conditions, the imaging position of the optical image of a subject at a finite distance needs to be spaced sufficiently from both the second surface of the first lens 20 and the first surface of the second lens 21. In order to sufficiently space the imaging position of the optical image of the subject at a finite distance from both surfaces, the optical image of the subject at a finite distance is preferably formed within the light-transmitting hole 22. Furthermore, in order to form the optical image of the subject at a finite distance within the light-transmitting hole 22, a subject at infinity needs to be imaged at any position on the first lens 20 side of the imaging position of the subject at a finite distance.

As described above, in order to provide telecentricity on the object side, the diaphragm needs to be positioned at the focal position of the first lens 20. Therefore, the diaphragm needs to be positioned on the first lens 20 side within the light-transmitting hole 22. Accordingly, the diaphragm needs to be provided between the first lens 20 and the connecting portion 19.

In order to reduce stray light from one unit optical system 23 to another unit optical system 23, the light beam striking the second surface of the first lens 20 and the first surface of the second lens 21 needs to be narrower than the diameter of the first and second lenses 20 and 21. In order to make the light beam narrower at the second surface of the first lens 20 and the first surface of the second lens 21, the distance between the second surface of the first lens 20 and the first surface of the second lens 21 needs to be shortened.

As the light shielding wall lengthens along the optical axis direction, the effect of preventing stray light increases. Accordingly, in order to maximize the effect by the light shielding wall of preventing stray light over the short distance between the second surface of the first lens 20 and the first surface of the second lens 21, it is desirable that all of the light paths between the first lens 20 and the second lens 21 be covered by the light-transmitting hole 22. In other words, one end of the light-transmitting hole 22 is preferably caused to coincide with the second surface of the first lens 20, and the other end is preferably caused to coincide with the first surface of the second lens 21. That is, the first lens 20, light-transmitting hole 22, and second lens are preferably arranged so that no void is provided between the light-transmitting hole 22 and each of the first lens 20 and the second lens 21.

Since no void is provided between the second surface of the first lens 20 and the light-transmitting hole 22, the diaphragm needs to be in close contact with the end of the light-transmitting hole 22 at the first lens 20 side. Instead of providing the diaphragm in close contact with the end of the light-transmitting hole 22, a small diameter region may be formed at the end of the light-transmitting hole 22 on the first lens 20 side, and this small diameter region may be caused to function as the diaphragm. Therefore, the small diameter region of the light-transmitting hole 22 is preferably located on or near the second surface of the first lens 20.

Next, the relationship between the curvature radius $r_{11}$ of the first surface of the first lens 20, the curvature radius $r_{12}$ of the second surface of the first lens 20, and the magnification $\beta_1$ of the first lens 20 as a condition for suppressing stray light is described.

In an optical system in which the lens array is formed integrally and is not optically separated, as in this disclosure, light striking the lens array may cut across the lens array at an angle with respect to the optical axis and become stray light, reaching the image surface independently of regular image formation.

In order to suppress such stray light, unnecessary incident light needs to be blocked at some position before reaching the image surface. In this embodiment, the conditions for unnecessary light to be blocked at an aperture provided near the second surface of the first lens 20, at an aperture disposed ahead of the first surface of the second lens 21, or at the inner wall of the light-transmitting hole 22 disposed between the first lens 20 and the second lens 21 were calculated with a simulation.

Preconditions at this time are that the optical system be substantially telecentric on the object side in order to expand the depth of field, and that the imaging position by the first lens 20 of the optical image of the subject at a finite distance not match either the second surface of the first lens 20 or the first surface of the second lens 21 in order to suppress image degradation due to dust or grime adhered to the lens surface.

First, for the optical system to be object side telecentric, Expression (11) needs to be satisfied.

Furthermore, so that the imaging position by the first lens 20 of the optical image of the subject does not match either the second surface of the first lens 20 or the first surface of the second lens 21, sufficient air spacing needs to be maintained between the first lens 20 and the second lens 21, and even if the subject position varies within the assumed depth of field, the imaging position by the first lens 20 needs to be within the spacing. In the case of document reading or the like by a scanner, it is assumed that the variation in the subject position will be smaller than ±2 mm. Therefore, a condition is that light emitted from a subject position shifted by 2 mm be collected further on the object side than the first surface of the second lens 21. As a result, the imaging position by the first lens 20, for which the effect of image degradation due to dust or grime is large, exists within the air spacing in which neither dust nor grime accumulate. In this way, the imaging position does not match a lens surface on which dust or grime can adhere, thus allowing for suppression of image degradation due to dust or grime.

Figure 12:
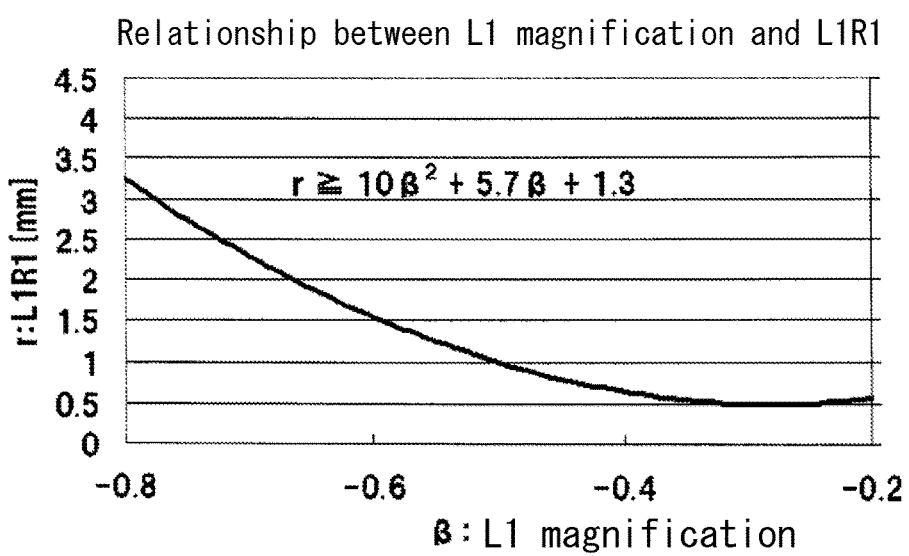
FIG. 12 is a graph illustrating the allowable range for the curvature radius of the first surface of the first lens with respect to the first lens magnification in Expression (3)
Figure 13:
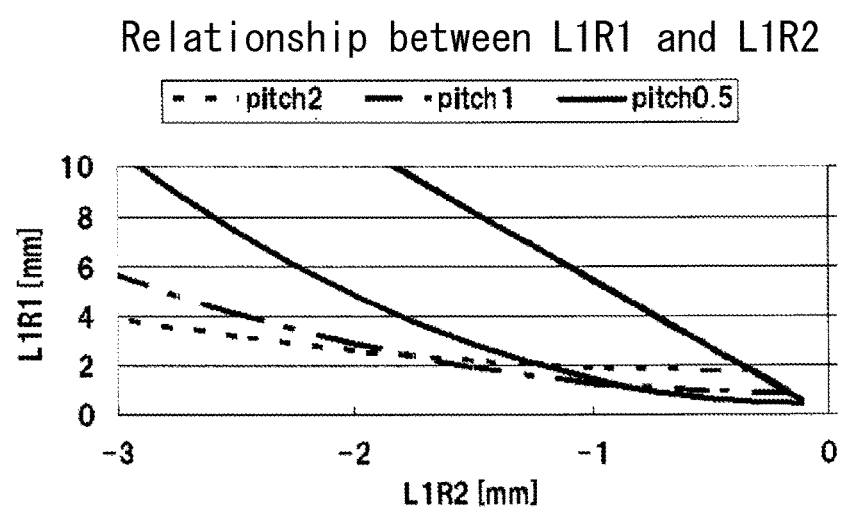
FIG. 13 is a graph illustrating the allowable range for the curvature radius of the first surface of the first lens with respect to the curvature radius of the second surface of the first lens in Expressions (4) and (5)

FIGS. 12 and 13 illustrate a simulation of the conditions on the curvature radius of the first surface and second surface of the first lens 20 and the magnification of the first lens 20 so as not to produce stray light. While taking into account the above preconditions, the angle of incidence of light and the pitch of the lens array were varied in the simulation.

FIG. 12 illustrates the relationship between the magnification $\beta_1$ of the first lens 20 and the curvature radius $r_{11}$ of the first surface of the first lens 20. The range above the curve in FIG. 12, represented by Expression (3), is necessary for suppression of stray light.

$$r_{11} \leq 10\beta_1^2 + 5.7\beta_1 + 1.3 \qquad (3)$$

$\beta_1$ is expressed as a negative value due to being inverted only in the first lens system and is preferably in a range of −0.3 to −0.6. If the absolute value of the magnification of the first lens 20, which is the primary imaging system, becomes too small, then the absolute value of the magnification of the second lens 21 increases, which tends to make aberration correction in the expansion system difficult. Therefore, the absolute value is preferably larger than 0.3. On the other hand, whereas the theoretical limit on the magnification of the first lens 20 is −1.0, various aberration corrections become difficult. Furthermore, as the absolute value of the magnification increases, the size of the intermediate image increases, leading to a reduction in the inter-pitch thickness of the inner wall of the light-transmitting hole 22, which is formed in the connecting portion 19 and functions as a light shielding wall. The connecting portion 19 thus becomes more difficult to manufacture. From this perspective, the absolute value of the magnification of the first lens 20 is preferably kept down to approximately 0.6.

In FIG. 13, the curvature radius $r_{11}$ of the first surface of the first lens 20 and the curvature radius $r_{12}$ of the second surface of the first lens 20 are represented as a relational expression, with the lens pitch p as a parameter. The lower limit on the curvature radius $r_{11}$ of the first surface of the first lens 20 differs depending on the pitch p, as illustrated in Expression (2).

$$r_{11} \geq 0.9 \qquad (2)$$

As the curvature radius $r_{11}$ of the first surface of the first lens 20 increases, the thickness $L_1$ of the first lens 20 increases, as per the relationship in Expression (11). For example, when the refractive index n of the first lens 20 is 1.53, letting $r_{11}$=3.5 yields $L_1$=10. Hence, the first lens 20 tends to become less compact.

The curvature radius $r_{11}$ also needs to be within the ranges of relational expressions represented by the curvature radius $r_{12}$ of the second surface of the first lens 20.

The upper limit is a straight line represented by Expression (4).

$$r_{11} \leq -5.5 r_{12} - 0.035p \qquad (4)$$

The lower limit is a curve represented by Expression (5).

$$r_{11} \geq \frac{1}{p} \cdot (0.6 r_{12}^2 + 0.2 p r_{12} + 0.9 p^2) \qquad (5)$$

Outside of these ranges, unnecessary light that strikes the first surface of the first lens 20 passes through the aperture (diaphragm) near the second surface of the first lens 20 and further passes by the light shielding wall disposed between the first lens 20 and the second lens 21, reaching the image surface and thus becoming stray light.

In this embodiment, each unit optical system 23 is formed so that Expression (6) is satisfied. In other words, the unit optical system 23 is designed so that the angle calculated by the allowable image shift amount δ and the allowable depth of field Δz becomes the maximum angle for $\theta_g$.

This condition is the condition that the unit optical system 23 be substantially telecentric on the object side. Based on paraxial theory, Expression (1) is a condition calculated for telecentricity on the object side. Therefore, telecentricity may be reduced due to factors other than the curvature radius of the first surface of the first lens 20 in the unit optical system 23. By satisfying a condition such as Expression (6) for the entire unit optical system 23, the misalignment between imaging positions in images formed by adjacent unit optical systems 23 can thus be suppressed enough to make visual confirmation difficult.

According to this embodiment, the unit optical systems 23 are formed so that $0.5 \leq y_0/D$, as illustrated in Expression (7). Therefore, all of the points on the object surface os can be included in the area of the field of view of one of the unit optical systems 23, thus preventing a partial gap in the image.

As $y_0/D$ increases, however, an object surface os separated at a distance from the optical axis becomes included in the area of the field of view of the unit optical system 23. Therefore, if $y_0/D$ increases, the number of unit optical systems 23 that form an image for a point on the object surface Os increases, thereby increasing the influence of misalignment between images formed by different unit optical systems 23.

To address this issue, in this embodiment, the unit optical systems 23 are formed so that $y_0/D \leq 1$. Therefore, by limiting the number of unit optical systems 23 that form an image for a point on the object surface Os to being two or less, the influence of misalignment between images can be reduced.

In this embodiment, each unit optical system 23 is formed so that Expression (8) is satisfied, and therefore as explained below, unevenness in the brightness can be suppressed.

As is known, an image by an optical system such as a lens is brightest where the image surface is and the optical axis intersect, and the image becomes darker with distance from the optical axis. Therefore, unevenness in brightness occurs in the formed image. In the case of a digital camera, the unevenness in brightness can be reduced by changing the amplification factor for each region of the image.

When the amount of light in a region distant from the optical axis is extremely low, however, the amplification factor needs to be set large, resulting in a large influence from noise. Therefore, the ratio of the amount of light to the amount of light along the optical axis is preferably set to exceed approximately 50% at any position.

In the case of the erecting equal-magnification lens array unit 13 in this embodiment, it suffices to obtain an amount of light exceeding approximately 50% by combining the light beams that pass through two adjacent unit optical systems 23. Therefore, it suffices to attain an amount of light exceeding approximately 25% from a single unit optical system 23. If the angle of incidence $\theta_g$ satisfies Expression (14) below, it is possible to transmit an amount of light exceeding 25% in the vicinity of the optical axis at any position within the field of view of a single unit optical system 23.

$$\frac{\frac{D}{2}}{L_0} \times 0.25 < \tan\theta_g \qquad (14)$$

The left side of Expression (9) is $D/8L_0$, and each unit optical system 23 is formed so that Expression (8) is satisfied. Therefore, unevenness in the brightness can be suppressed to the point at which compensation by amplification is possible.

However, when the light beam defining the amount of light at the lens center of a single optical system (F number light beam) is small with respect to the diameter of the first surface of the first lens 20, the amount of light at the lens center becomes relatively smaller. Hence, the above-described unevenness in the amount of light is reduced. Accordingly, unevenness in the amount of light may be sufficiently suppressed even when Expression (8) is not satisfied.

According to this embodiment, the first lenses 20 are arranged to be in close contact to each other along the first direction. This structure allows for the formation of an image without gaps along the first direction.

In this embodiment, as described above, each unit optical system 23 is substantially telecentric on the object side, and therefore the amount of transmitted light from a point located outside of the diameter of the unit optical system 23 is low. Therefore, if there is a space between adjacent unit optical systems 23, the image for points on the object surface os along an extension of the space becomes extremely dark, which may cause the image to have gaps. However, as described above, the first lenses 20 are in close contact along the first direction, and therefore such spaces do not exist, making it possible to achieve an image without gaps along the first direction.

In this embodiment, since the diameter of each light-transmitting hole 22 at the first lens 20 side is smaller than the diameter at the second lens 21 side, stray light from the first lens 20 of another unit optical system 23 can be prevented from striking the second lens 21.

Among the first lenses 20 in close contact with one another, stray light might enter from the lateral surface or the like of an adjacent first lens 20. Due to the intermingling of such stray light, the influence of noise on the formed image increases. As in this embodiment, however, stray light can be inhibited by using the light-transmitting holes 22 to suppress stray light from entering the second lenses 21, thus making it possible to reduce the influence of noise on the image.

In this embodiment, treatment to suppress reflection of light or treatment to absorb light is applied to the inner surface of the light-transmitting hole 22. Therefore, propagation to the second lens 21 of stray light that passes through the aperture at the first lens 20 side and strikes the inner surface of the light-transmitting hole 22 can be prevented.

Next, defining the ratio of the field of view radius $y_0$ to the diameter D of the unit optical system 23 as a degree of overlap m, the relationship between the degree of overlap m and the image shift amount δ is described with reference to numerical values. Expressions (15) and (16) below hold, where the angle of incidence of light emitted from any point on the object surface os is θ.

$$\tan\theta = \frac{y_0 - \frac{D}{2}}{L_0} \qquad (15)$$

$$\tan\theta = \frac{\delta}{\Delta z} \qquad (16)$$

Expression (17) below is derived using Expressions (15) and (16) and the degree of overlap m.

$$\delta = \frac{\Delta z \times D \times \left(m - \frac{1}{2}\right)}{L_0} \qquad (17)$$

Figure 9:
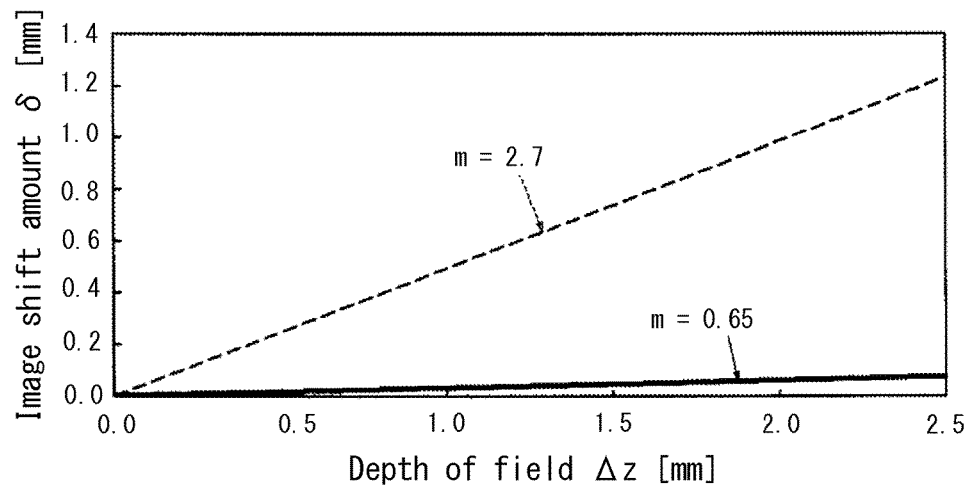
FIG. 9 is a graph showing the relationship between depth of field and allowable image shift amount in order to illustrate the change in image shift amount due to a difference in degree of overlap.

As is clear from Expression (17), as the degree of overlap m varies from ½, the image shift amount δ increases. FIG. 9 illustrates the relationship between the depth of field Δz and the image shift amount δ using the examples of m=0.65 and m=2.7. Note that D=2.0 and $L_0$=9.

As the image shift amount δ increases, the resolution of the erecting equal-magnification lens array unit 13 as a whole decreases, resulting in an increased misalignment between imaging positions formed by adjacent unit optical systems 23 for the same point on the object surface Os. As illustrated in FIG. 9, for the same depth of field Δz, the image shift amount δ is smaller when m=0.65 than when m=2.7. Accordingly, it is clear that as the difference between m and ½ increases, the misalignment of imaging positions increases.

For example, when the allowable image shift amount δ is 0.05 mm, which is used as an example of the pixel pitch of the image sensor 14, the depth of field Δz is 0.1 mm when m=2.7. On the other hand, when m=0.65, the depth of field Δz is 0.65 mm. It is thus clear that the depth of field Δz determined based on the allowable image shift amount is deeper as the degree of overlap m is closer to ½.

Embodiment 2

Next, Embodiment 2 is described. Embodiment 2 differs from Embodiment 1 in the design of the first lens 20'. The first lens 20' of this embodiment is designed and formed so that Expressions (1), (18), and (19) below are satisfied.

$$\left|\frac{r_{11}}{L_1} - \frac{n-1}{n}\right| \leq 0.2 \quad (1)$$

$$\frac{f_1^2}{L_0 + f_1 - 2} \leq L_{12} \quad (18)$$

$$4 \leq L_0/p \leq 7 \quad (19)$$

Here, $L_0$ is the object distance (distance between the object and the first surface of the first lens), $f_1$ is the focal length of the first lens 20, $L_{12}$ is the interval between the first lens 20 and the second lens 21, and p is the lens pitch of the lens array.

Furthermore, as in Embodiment 1, each unit optical system 23 is designed and formed so that Expression (6) below is satisfied.

$$\tan\theta_g < \frac{\delta}{\Delta z} \quad (6)$$

Furthermore, as in Embodiment 1, each unit optical system 23 is designed and formed so that Expression (7) below is satisfied.

$$0.5 \leq \frac{y_0}{D} \leq 1.0 \quad (7)$$

Furthermore, as in Embodiment 1, each unit optical system 23 is designed and formed so that Expression (8) below is satisfied.

$$\frac{D}{8 \times L_0} < \tan\theta_g \quad (8)$$

Next, the conditions for suppressing the effect of dust or grime adhered to the lens surface are described. As described above, the imaging position of the optical image of a subject at a finite distance by the first lens needs to be spaced sufficiently from the second surface of the first lens 20 and the first surface of the second lens 21.

In this disclosure, the imaging position for infinity by the first lens 20 substantially matches the second surface of the first lens 20. Since the finite distance imaging position of the first lens 20 is shifted towards the second lens 21 from the imaging position for infinity, an image is formed at a position separated from the second surface of the first lens 20. By causing the finite distance imaging position of the first lens 20 (intermediate imaging position) not to match the first surface of the second lens 21, the effect of dust or grime adhered to the lens surface can be suppressed. Therefore, the conditions necessary for the first lens 20 are calculated below with reference to FIG. 14.

By Newton's formula, Expression (20) holds, where $f_1$ is the focal length of the first lens 20, x is the distance between the front focal point and the object, and x' is the distance between the back focal point and the imaging position of the object.

$$x \cdot x' = -f_1^2 \quad (20)$$

Figure 14:
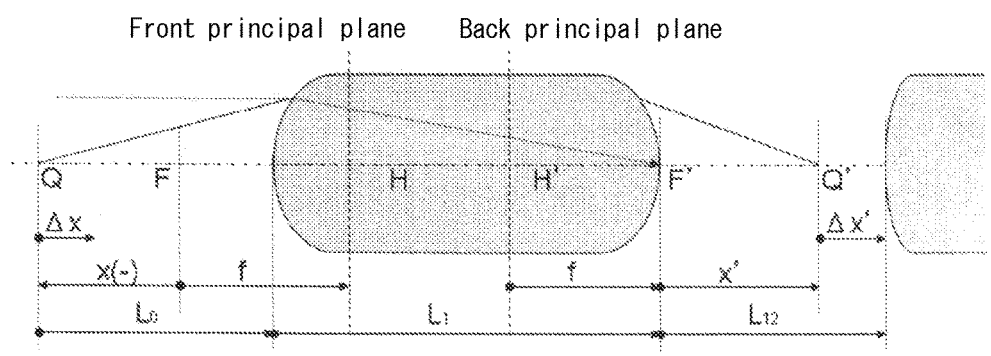
FIG. 14 illustrates the relational expressions related to image formation.

It is to be noted that, as illustrated in FIG. 14, the distance x is a negative value.

Assuming that the object is shifted by Δx, and that as a result, the imaging position is shifted by Δx', then Expression (20) becomes Expression (21).

$$(x+\Delta x) \cdot (x'+\Delta x') \quad (21)$$

Expression (21) can be transformed into Expression (22).

$$x' + \Delta x' = -\frac{f_1^2}{x + \Delta x} \quad (22)$$

Here, the absolute value of x is approximated as the sum of the object distance $L_0$ and the focal length $f_1$ (strictly speaking, this sum is equal to or greater than x, yet in this disclosure, where the first lens 20 is thick and is a biconvex lens, this approximation is a good design constraint).

Furthermore, Δx is the shift amount from the predetermined object distance and corresponds to the desired depth of field. When assuming document reading or the like by a scanner, a value of approximately 2 mm for Δx is reasonable.

Furthermore, so that the optical image of a subject at a finite distance does not form on the first surface of the second lens 21, the left side needs to be smaller than the interval $L_{12}$ between the first lens 20 and the second lens 21.

Based on the above, by satisfying Expression (18), the intermediate imaging position by the first lens 20 can be disposed in the space between the first lens 20 and the second lens 21.

$$\frac{f_1^2}{L_0 + f_1 - 2} \leq L_{12} \quad (18)$$

In order to provide a greater margin, the approximation of x may be eliminated, or Δx may be set to a value greater than 2 mm.

Figure 15:
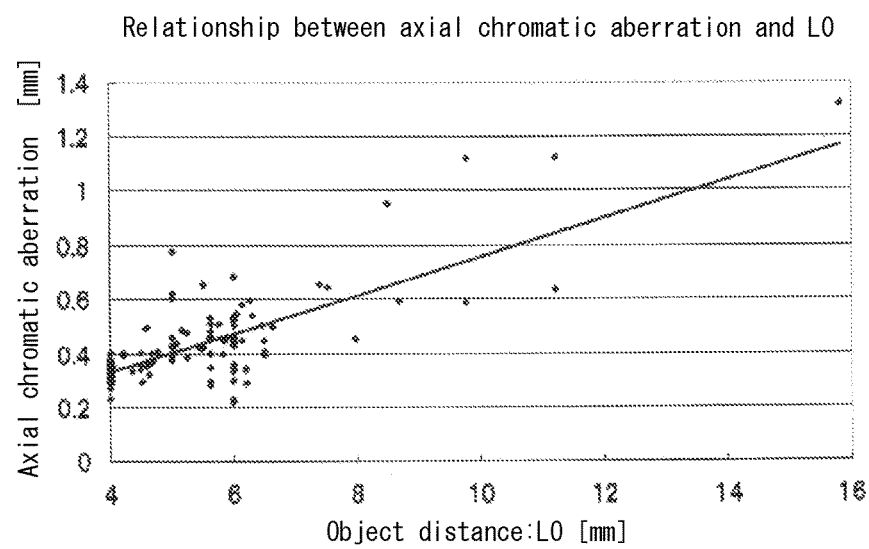
FIG. 15 illustrates the relationship between object distance and axial chromatic aberration.
Figure 16:
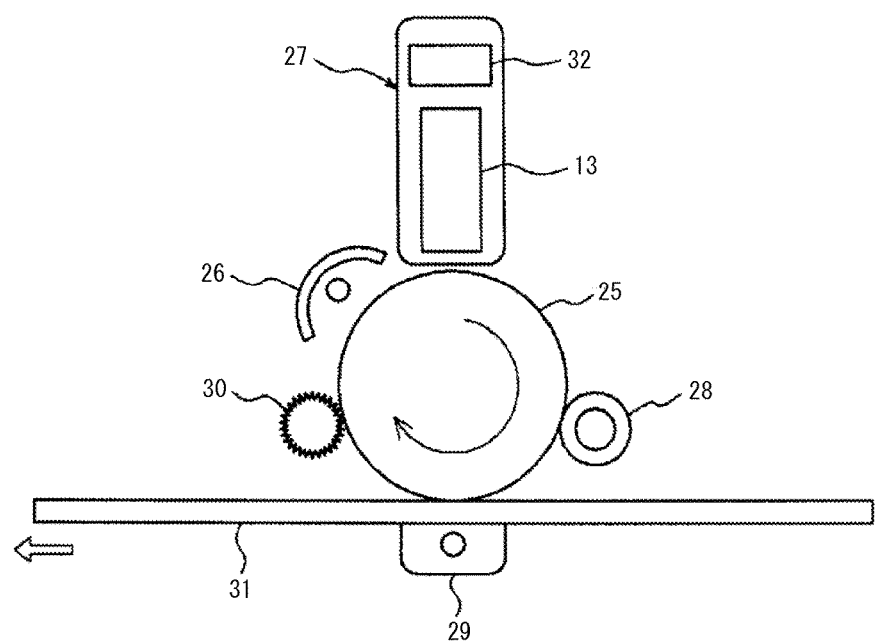
FIG. 16 is a structural diagram schematically illustrating the structure of an image forming device including the erecting equal-magnification lens array unit according to one of the disclosed embodiments.

Next, the conditions on the object distance $L_0$ in order to suppress axial chromatic aberration are described with reference to FIG. 15.

Due to constraints on a structure with two biconvex lenses, the dispersion of glass related to chromatic aberration is preferably small. Resin glass with an Abbe number vd of approximately 55 to 58 can be obtained easily. While some molding glass has a large value for Abbe's number, a numerical simulation was performed using vd=55 as the worst condition.

In addition to the above-described conditions, simulations performed while changing the object distance $L_0$ indicated that the object distance $L_0$ and the axial chromatic aberration have a roughly proportional relationship. Here, the wavelength of the axial chromatic aberration calculation is the difference between 620 nm and 480 nm.

The object distance $L_0$ for suppressing axial chromatic aberration thus needs to satisfy Expression (19).

$$4 \leq L_0/p \leq 7 \quad (19)$$

The upper limit of the right side of Expression (19) is calculated assuming that axial chromatic aberration is to be kept down to 0.5 mm or less, which represents a range that does not greatly diminish the depth of field. If the axial chromatic aberration is greater than 0.5 mm, color bleeding becomes a concern, depending on the F value of the unit optical system. This means that if the F value is 12, the position of arrival by wavelength on the image surface shifts by 0.02 mm. In the case of using a 600 dpi scanner system, the pixel pitch of the CCD sensors is 0.0423 mm. Hence, a shift corresponding to approximately 0.5 times the pixel pitch is an amount that could have a visible effect.

On the other hand, a small lower limit for the left side of Expression (19) is advantageous for suppressing axial chromatic aberration yet is not necessarily advantageous in terms of performance of the optical system overall. If the lens and the object are too close, interference by the frame holding the lens array is also a concern. Furthermore, when an object (document or photograph) or the like is irradiated by an image reading device or the like, a minimum amount of space needs to be guaranteed to transmit the irradiation light. Taking these points into consideration, a value of 4 mm or more is reasonable.

Examples

Next, the effects of this disclosure are described via examples, yet these examples are provided merely to illustrate the effects of this disclosure and in no way limit this disclosure.

Using the lens data in Table 1 and Table 2, the unit optical system 23 of Example 1 was designed. The surfaces corresponding to the surface numbers in Table 1 are shown in FIG. 2.

TABLE 1

| Surface number | Curvature radius | Thickness | Aperture radius | Glass material |
|---|---|---|---|---|
| \|object\| | ∞ | 1.50 | | |
| 1 | ∞ | 1.00 | | (*2) |
| 2 | ∞ | 4.00 | | |
| 3 (*1) | 1.6965 | 5.00 | 0.700 | (*3) |
| 4 | −1.1171 | 0.05 | | |
| 5 (*4) | ∞ | 1.85 | 0.125 | |
| 6 | ∞ | 0.10 | 0.370 | |
| 7 (*1) | 0.5977 | 6.00 | | (*3) |
| 8 (*1) | −1.4655 | 0.00 | 0.500 | |
| 9 | ∞ | 5.163 | | |
| \|image\| | ∞ | 0.00 | | |

Note the following in Table 1.
(*1: indicates an aspheric surface, with the aspheric surface equation being given by Expression (23) below.
(*2: SCHOTT AG bk7
(*3: ZEONEX (registered trademark) E48R by Zeon Corporation
(*4: diaphragm $$z = \frac{\frac{h^2}{r}}{1 + \sqrt{1 - (1+k)\left(\frac{h^2}{r}\right)}} + Ah^4 + Bh^6 + Ch^8 + Dh^{10} \quad (23)$$

In Expression (23), Z is the depth from the tangent plane with respect to the surface apex, r is the curvature radius, h is the height from the optical axis, k is the conic constant, A is a fourth-order aspheric surface coefficient, B is a sixth-order aspheric surface coefficient, C is an eighth-order aspheric surface coefficient, and D is a tenth-order aspheric surface coefficient.

Table 2 lists the conic constant k and the aspheric surface coefficients A, B, C, and D.

TABLE 2

| | $3^{rd}$ surface | $7^{th}$ surface | $8^{th}$ surface |
|---|---|---|---|
| k | 0.0000 | 0.0000 | 0.0000 |
| A | −0.0879 | 0.9527 | 0.0045 |
| B | 0.0042 | −5.7837 | −0.0454 |
| C | 0.0000 | 0.0000 | 0.0000 |
| D | 0.0000 | 0.0000 | 0.0000 |

Using the lens data in Table 3 and Table 4, the unit optical system 23 of Example 2 was also designed. The surfaces corresponding to the surface numbers in Table 3 are the same as in Table 1.

TABLE 3

| Surface number | Curvature radius | Thickness | Aperture radius | Glass material |
|---|---|---|---|---|
| \|object\| | ∞ | 1.50 | | |
| 1 | ∞ | 1.00 | | (*2) |
| 2 | ∞ | 2.138 | | |
| 3 (*1) | 1.4272 | 5.00 | 0.700 | (*3) |
| 4 | −1.0527 | 0.05 | | |
| 5 (*4) | ∞ | 2.188 | 0.125 | |
| 6 | ∞ | 0.10 | 0.550 | |
| 7 (*1) | 0.8973 | 9.00 | | (*3) |
| 8 (*1) | −1.8566 | 0.00 | 0.500 | |
| 9 | ∞ | 5.779 | | |
| \|image\| | ∞ | 0.00 | | |

Note the following in Table 3.
(*1: indicates an aspheric surface, with the aspheric surface equation being given by Expression (22) above.
(*2: SCHOTT AG bk7
(*3: ZEONEX (registered trademark) E48R by Zeon Corporation
(*4: diaphragm Table 4 lists the conic constant k and the aspheric surface coefficients A, B, C, and D.

TABLE 4

| | $3^{rd}$ surface | $7^{th}$ surface | $8^{th}$ surface |
|---|---|---|---|
| k | 0.0000 | 0.0000 | 0.0000 |
| A | −0.0942 | 0.0060 | 0.0222 |
| B | −0.0005 | −0.4375 | 0.0000 |
| C | 0.0000 | 0.0000 | 0.0000 |
| D | 0.0000 | 0.0000 | 0.0000 |

Using the lens data in Table 5 and Table 6, the unit optical system 23 of Example 3 was also designed. The surfaces corresponding to the surface numbers in Table 5 are the same as in Table 1.

TABLE 5

| Surface number | Curvature radius | Thickness | Aperture radius | Glass material |
|---|---|---|---|---|
| \|object\| | ∞ | 1.500 | | |
| 1 | ∞ | 1.000 | | (*2) |
| 2 | ∞ | 1.500 | | |
| 3 (*1) | 1.3000 | 3.750 | 0.460 | (*3) |
| 4 | −0.6890 | 0.050 | | |
| 5 (*4) | ∞ | 1.500 | 0.095 | |
| 6 | ∞ | 0.100 | 0.300 | |
| 7 (*1) | 0.5359 | 6.637 | | (*3) |

TABLE 5-continued

| Surface number | Curvature radius | Thickness | Aperture radius | Glass material |
|---|---|---|---|---|
| 8 (*1) | −1.5108 | 0.100 | | |
| 9 | ∞ | 5.268 | 0.400 | |
| \|image\| | ∞ | 0.000 | | |

Note the following in Table 5.
(*1: indicates an aspheric surface, with the aspheric surface equation being given by Expression (22) above.
(*2: SCHOTT AG bk7
(*3: ZEONEX (registered trademark) E48R by Zeon Corporation
(*4: diaphragm Table 6 lists the conic constant k and the aspheric surface coefficients A, B, C, and D.

TABLE 6

| | $3^{rd}$ surface | $7^{th}$ surface | $8^{th}$ surface |
|---|---|---|---|
| k | −1.9929 | −0.7000 | −4.3906 |
| A | −0.0851 | 0.2179 | −0.0866 |
| B | 0.0847 | −3.1730 | −0.0799 |
| C | 0.0000 | 0.0000 | −0.0811 |
| D | 0.0000 | 0.0000 | 0.0000 |

Using the lens data in Table 7 and Table 8, the unit optical system 23 of Example 4 was also designed. The surfaces corresponding to the surface numbers in Table 7 are the same as in Table 1.

TABLE 7

| Surface number | Curvature radius | Thickness | Aperture radius | Glass material |
|---|---|---|---|---|
| \|object\| | ∞ | 1.50 | | |
| 1 | ∞ | 1.00 | | (*2) |
| 2 | ∞ | 1.50 | | |
| 3 (*1) | 1.3078 | 5.00 | 0.475 | (*3) |
| 4 (*1) | −0.4458 | 0.00 | | |
| 5 (*4) | ∞ | 1.20 | 0.100 | |
| 6 | ∞ | 0.10 | 0.220 | |
| 7 (*1) | 0.4135 | 5.896 | | (*3) |
| 8 (*1) | −1.4939 | 0.00 | 0.400 | |
| 9 | ∞ | 5.078 | | |
| \|image\| | ∞ | 0.00 | | |

Note the following in Table 7.
(*1: indicates an aspheric surface, with the aspheric surface equation being given by Expression (22) above.
(*2: SCHOTT AG bk7
(*3: ZEONEX (registered trademark) E48R by Zeon Corporation
(*4: diaphragm Table 8 lists the conic constant k and the aspheric surface coefficients A, B, C, and D.

TABLE 8

| | $3^{rd}$ surface | $4^{th}$ surface | $7^{th}$ surface | $8^{th}$ surface |
|---|---|---|---|---|
| k | 0.0000 | 0.0000 | 0.0000 | 0.0000 |
| A | −0.0983 | 4.0018 | −2.0150 | 0.2355 |
| B | 0.0000 | 0.0000 | 12.6366 | −1.0161 |
| C | 0.0000 | 0.0000 | 0.0000 | 1.1564 |
| D | 0.0000 | 0.0000 | 0.0000 | 0.0000 |

Next, for the unit optical system 23 in Examples 1 to 4, it was calculated whether a first lens 20 satisfying Expression (1) could be designed. Table 9 lists the calculation results.

TABLE 9

| | Example 1 | Example 2 | Example 3 | Example 4 |
|---|---|---|---|---|
| $\left\| \dfrac{r_{11}}{L_1} - \dfrac{n-1}{n} \right\|$ | 0.007 | 0.061 | 0.000 | 0.020 |

As shown in Table 9, in each of Examples 1 to 4, the absolute value of the left side of Expression (1) is less than 0.2. It is thus clear that a first lens 20 satisfying Expression (1) in the unit optical system 23 in Examples 1 to 4 can be designed.

The field of view radius $y_0$ of the unit optical system 23 and the diameter D of the unit optical system 23 in Examples 1 to 4 were measured, and the ratio of the field of view radius $y_0$ to the diameter D was calculated. Table 8 lists the calculation results.

TABLE 10

| | Example 1 | Example 2 | Example 3 | Example 4 |
|---|---|---|---|---|
| Field of view radius $y_0$ | 0.80 | 0.80 | 0.59 | 0.56 |
| Sensor diameter D | 1.50 | 1.00 | 1.00 | 1.00 |
| $y_0/D$ | 0.53 | 0.53 | 0.59 | 0.56 |

As shown in Table 10, the unit optical system 23 can be formed so that $0.5 \leq y_0/D \leq 1.0$.

The object distance $L_0$, focal length $f_1$, and lens interval $L_{12}$ of the unit optical system 23 in Examples 1 to 3 were also measured, $$\frac{f_1^2}{L_0 + f_1 - 2}$$

and the axial chromatic aberration was calculated. Table 11 lists the calculation results.

TABLE 11

| | Example 1 | Example 2 | Example 3 |
|---|---|---|---|
| Object length $L_0$ | 6.5 | 4.638 | 4.0 |
| Focal length $f_1$ | 3.31 | 3.80 | 2.45 |
| Lens interval $L_{12}$ | 2.0 | 2.34 | 1.65 |
| $\dfrac{f_1^2}{L_0 + f_1 - 2}$ | 1.50 | 2.24 | 1.35 |
| Axial chromatic aberration | 0.41 | 0.33 | 0.34 |

Table 11 shows that it is possible to form an unit optical system 23 such that $$\frac{f_1^2}{L_0 + f_1 - 2} \leq L_{12}$$

and such that the axial chromatic aberration is 0.5 mm or less for the range of $4 \leq L_0/p \leq 7$.

Based on the field of view radius $y_0$ of the unit optical system 23 and the diameter D of the unit optical system 23 in Examples 1 to 4, the depth of field Δz was also calculated. Note that the allowable image shift amount δ was set to 0.05 mm. Table 12 lists the calculation results.

TABLE 12

|  | Example 1 | Example 2 | Example 3 | Example 4 |
|---|---|---|---|---|
| θg [deg] | 0.861 | 0.660 | 1.449 | 1.156 |
| tanθg | 0.0150 | 0.0115 | 0.0253 | 0.0202 |
| Δz | 3.33 | 4.34 | 1.98 | 2.48 |

The depth of field is ±0.4 when using a conventional Selfoc (registered trademark) lens or a rod lens. As illustrated by Table 12, however, the depth of field was expanded as compared to a conventional lens to ±3.3 in Example 1, to ±4.3 in Example 2, to ±2.0 in Example 3, and to ±2.5 in Example 4.

Figure 10:
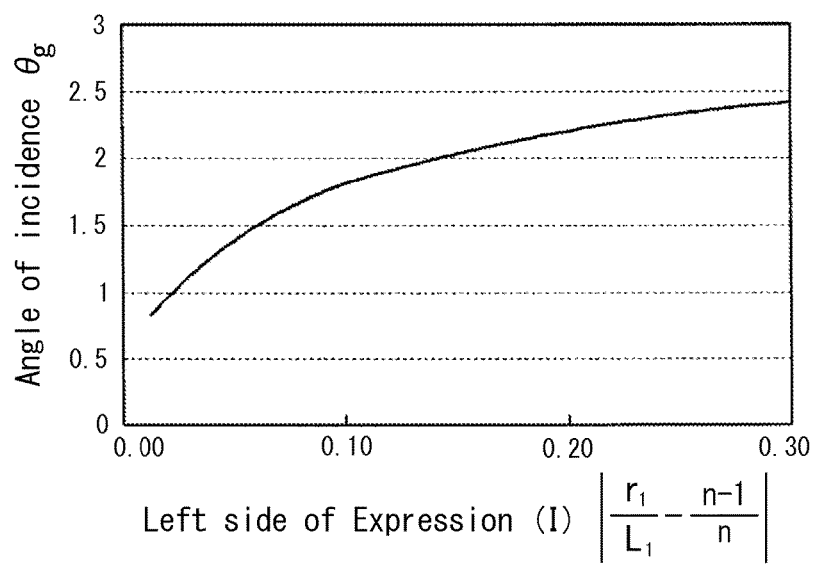
FIG. 10 is a graph illustrating the relationship between the left side of Expression (1) and the angle of incidence.

A first lens 20 for which the left side of Expression (1) was 0 to 0.2 was designed by fixing the thickness $L_0$ of the first lens 20 and varying the curvature radius $r_{11}$ of the first surface. In the designed lens, the influence on telecentricity of the misalignment from the diaphragm of the imaging position for infinity was examined. The angle of incidence $\theta_g$ into the unit optical system 23 of a light ray that passes through the center of gravity cg of the fine optical image fi illustrated in FIG. 4 was used as the index for telecentricity. As the angle of incidence $\theta_g$ increases, the telecentricity reduces. FIG. 10 illustrates the relationship between the left side of Expression (1) and the angle of incidence $\theta_g$.

As illustrated in FIG. 10, as the left side of Expression (1) increases, the angle of incidence $\theta_g$ increases. In order to obtain the telecentricity required for the erecting equal-magnification lens array unit 13, the angle of incidence $\theta_g$ is preferably less than 2.5°. In FIG. 10, if the left side of Expression (1) is less than 0.3, it is clear that the angle of incidence $\theta_g$ is less than 2.5.

Figure 11:
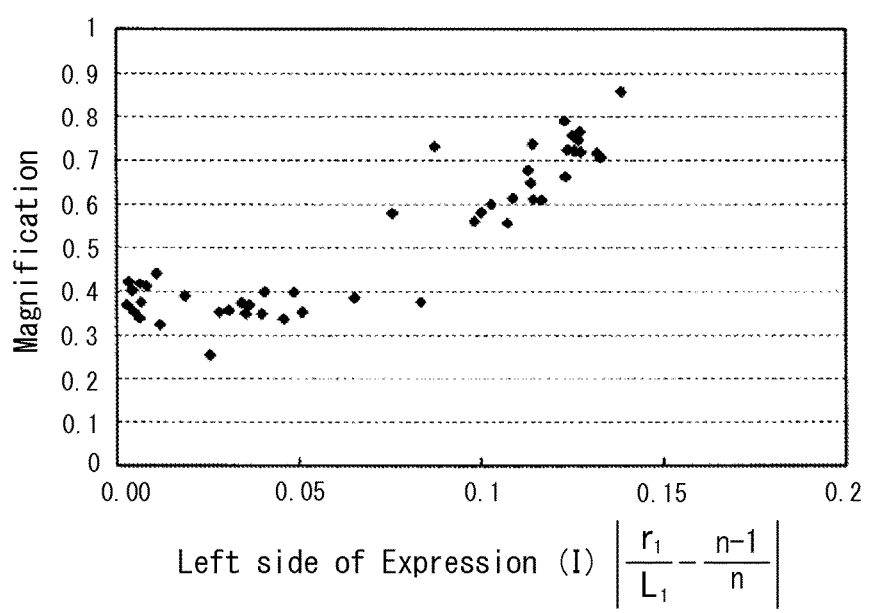
FIG. 11 is a graph illustrating the relationship between the left side of Expression (1) and the magnification of the lens.

A first lens 20 for which the left side of Expression (1) was 0 to 0.15 was also designed, and the magnification of the designed lens was examined. FIG. 11 illustrates the relationship between the left side of Expression (1) and the magnification.

As illustrated in FIG. 11, it is clear that as the left side of Expression (1) increases, the magnification increases. Furthermore, it is clear that if the left side of Expression (1) is less than 0.2, the magnification of the first lens 20 is less than one.

Although this disclosure is based on embodiments with reference to the accompanying drawings, it is to be noted that various changes and modifications will be apparent to those skilled in the art based on this disclosure. Therefore, such changes and modifications are to be understood as included within the scope of this disclosure.

The erecting equal-magnification lens array unit of this embodiment is provided in the image reading unit 10 used in an image reading device, yet the erecting equal-magnification lens array unit may be used in an image forming device 27 illustrated in FIG. 14. The image forming device 27 is used in an LED laser printer 24, for example.

The laser printer 24 includes a photoconductive drum 25, a charger 26, the image forming device 27, a developing unit 28, a transfer unit 29, and a charge remover 30. The photoconductive drum 25 is cylindrical and rotates about an axle. The charger 26 charges the surface of the photoconductive drum 25. The image forming device 27 forms an electrostatic latent image on the charged photoconductive drum 25. The developing unit 28 develops the electrostatic latent image with toner. The transfer unit 29 transfers the developed image to paper 31. The charge remover 30 removes the charge from the charged photoconductive drum 25.

The image forming device 27 includes the erecting equal-magnification lens array unit 13 of this embodiment and an LED substrate 32. LEDs are provided in a straight line on the LED substrate 32. By controlling the light emitted by each LED, the LED substrate 32 forms a 1D image. The erecting equal-magnification lens array unit 13 exposes the image formed by the LED substrate 32 to the above-described photoconductive drum 25.

In this embodiment, the light-transmitting hole 22 is formed to have the shape illustrated in FIG. 6, yet the light-transmitting hole 22 is not limited to this shape. When forming the light-transmitting hole 22, if the thickness of the aperture is roughly 0.05 mm or more, then the light-transmitting hole 22 may be formed to have the shape illustrated in FIG. 6 by mold injection.

If the thickness of the aperture is less than 0.05 mm, however, formation by mold injection is difficult. When necessary, an aperture of less than 0.05 mm may be formed by boring a hole in SUS and PET material, the surface of which has been colored black, and adhering the result to the portion containing the light-transmitting hole. In this case, however, the linear expansion coefficients of the first lens array 17 and the aperture may differ. Upon a temperature change, misalignment may therefore occur between the positions of the optical axis and the aperture. Hence, a design that anticipates the effect of positional misalignment is necessary. In order to suppress positional misalignment between the optical axis and the aperture due to a temperature change, the difference between the linear expansion coefficients of the first lens array 17 and the aperture is preferably reduced during formation. For example, the linear expansion coefficients may be caused to match by coating the second surface of the first lens array 17 black so as to form the aperture. The linear expansion coefficients may also be caused to match by printing in black so that the aperture is formed in a transparent plate of the same member as the member for the first lens array 17.

REFERENCE SIGNS LIST

10 Image reading unit
11 Cover glass
12 Illumination system
13, 13' Erecting equal-magnification lens array unit
14 Image sensor
15 Position regulating member
16 Hole
17 First lens array
18 Second lens array
19 Connecting portion
20 First lens
21 Second lens
22 Light-transmitting hole
23, 23' Unit optical system
24 Laser printer
25 Photoconductive drum
26 Charger
27 Image forming device
28 Developing unit
29 Transfer unit
30 Charge remover
31 Paper
cg Center of gravity
cl Center line
fi Fine optical image
ics Image reading surface
is Image surface os Object surface

The invention claimed is:
1. An erecting equal-magnification lens array unit comprising:
- a first lens array including a plurality of first lenses, the first lenses being arranged along a first direction perpendicular to optical axes of the first lenses;
- a second lens array including a plurality of second lenses, optical axes of the second lenses overlapping with optical axes of the first lenses, the second lenses being arranged along the first direction; and
- a light blocking portion between each first lens and each second lens with overlapping optical axes, an aperture being formed in the light blocking portion near a second surface of the first lens, wherein each optical system formed by each first lens, the aperture, and each second lens with overlapping optical axes is an erecting equal-magnification optical system, and the following expressions are satisfied:

$$\left| \frac{r_{11}}{L_1} - \frac{n-1}{n} \right| \leq 0.2,$$

$$r_{11} \geq 0.9p,$$

$$r_{11} \geq 10\beta_1^2 + 5.7\beta_1 + 1.3,$$

$$r_{11} \leq -5.5r_{12} - 0.035p, \text{ and}$$

$$r_{11} \geq \frac{1}{p} \cdot (0.6r_{12}^2 + 0.2pr_{12} + 0.9p^2),$$

where $r_{11}$ is a curvature radius of a first surface of the first lens, $L_1$ is a thickness of the first lens, n is a refractive index of the first lens, $r_{12}$ is a curvature radius of a second surface of the first lens, and p is a lens pitch of the lens array.

2. An image reading device comprising the erecting equal-magnification lens array unit of claim 1.

3. An image forming device comprising the erecting equal-magnification lens array unit of claim 1.

\* \* \* \* \*